(12) United States Patent
Takayanagi et al.

(10) Patent No.: US 7,090,234 B2
(45) Date of Patent: Aug. 15, 2006

(54) THREE-WHEEL VEHICLE WITH SWINGING MECHANISM

(75) Inventors: Shinji Takayanagi, Wako (JP); Yohei Makuta, Wako (JP); Hiroyoshi Kobayashi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 166 days.

(21) Appl. No.: 10/667,950

(22) Filed: Sep. 22, 2003

(65) Prior Publication Data

US 2004/0119259 A1 Jun. 24, 2004

(30) Foreign Application Priority Data

Sep. 30, 2002 (JP) ............................. 2002-288118

(51) Int. Cl.
*B60G 21/05* (2006.01)

(52) U.S. Cl. ................ 280/124.103; 280/124.134; 280/124.107; 280/124.111; 280/124.112; 180/210

(58) Field of Classification Search ................ 280/270, 280/271, 272, 267, 124.103, 124.106, 124.107, 280/124.134, 124.111, 124.112; 180/210
See application file for complete search history.

(56) References Cited

U.S. PATENT DOCUMENTS

| | | | | |
|---|---|---|---|---|
| 2,164,602 A | * | 7/1939 | Valletta | ...................... 267/190 |
| 2,536,769 A | * | 1/1951 | Rix et al. | ............. 280/124.106 |
| 3,598,385 A | * | 8/1971 | Parsons, Jr. | .................. 267/30 |
| 4,470,611 A | * | 9/1984 | Duphily et al. | ............. 280/104 |
| 4,546,997 A | | 10/1985 | Smyers | |
| 4,589,678 A | * | 5/1986 | Lund | ........................ 280/5.511 |
| 5,364,114 A | * | 11/1994 | Petersen | .............. 280/124.151 |
| 5,941,546 A | * | 8/1999 | Pellerin | ............... 280/124.116 |
| 6,276,480 B1 | * | 8/2001 | Aregger | ...................... 180/213 |
| 6,766,876 B1 | * | 7/2004 | Ozeki et al. | ................. 180/311 |
| 2002/0027030 A1 | | 3/2002 | Tagami et al. | |

FOREIGN PATENT DOCUMENTS

JP       58-24310       5/1983

\* cited by examiner

*Primary Examiner*—Ruth Ilan
(74) *Attorney, Agent, or Firm*—Hamre, Schumann, Mueller & Larson, P.C.

(57) ABSTRACT

In a three-wheel vehicle, right and left suspension arms are independently attached to a front swinging shaft and a rear swinging shaft so that the suspension arms can swing vertically, and the front swinging shaft and the rear swinging shaft function as a swinging shaft for swinging the body frame. A swinging mechanism is provided to restrict lateral rotation of the body frame.

11 Claims, 20 Drawing Sheets

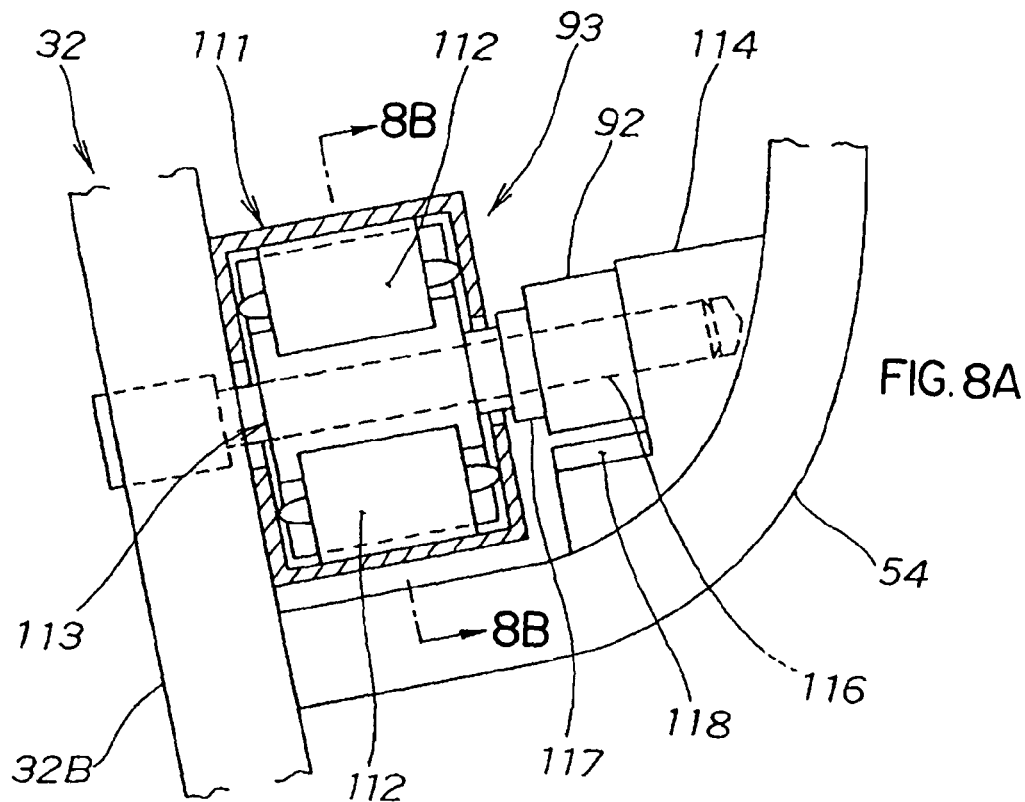
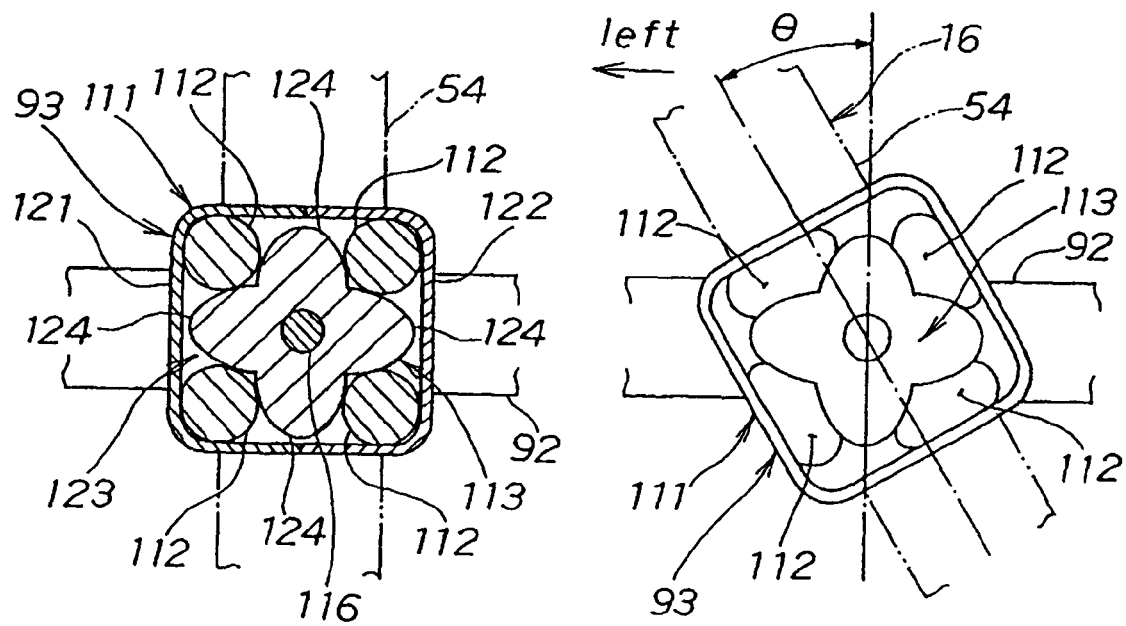
FIG. 8B
FIG. 8C

THREE-WHEEL VEHICLE WITH SWINGING MECHANISM

BACKGROUND OF THE INVENTION

1. Field of the Invention

The present invention relates to a three-wheel vehicle provided with a swinging mechanism, which reduces costs and enhances ride comfort.

2. Description of the Related Art

A three-wheel vehicle provided with a swinging mechanism in which right and left rear wheels are coupled via a shaft is known. For example, Japanese published examined patent application No. Sho58-24310 discloses such a vehicle. FIG. 19 is a side view showing a conventional type three-wheel vehicle (such as shown in Japanese published examined patent application No. Sho58-24310) provided with a swinging mechanism. A front frame 202 provided with one front wheel 201 and a rear frame 205 provided with right and left rear wheels 203, 204 are coupled via a pivot coupling device 206.

The pivot coupling device 206 is composed of a housing attached to the front frame 202 and a pivot the front of which is rotatably attached to the housing and the rear of which is attached to the rear frame 205, and the front frame 202 can be rolled around a pivot axis 207 for the rear frame 205.

FIG. 20 is a sectional view showing the rear of the conventional type three-wheel vehicle provided with the swinging mechanism and shows that one end of an intermediate shaft 212 is connected to a rear wheel shaft 211 to which one rear wheel 203 is attached via splines, the other rear wheel shaft 214 is attached to the other end of the intermediate shaft 212 via friction differential gears 213 and the other rear wheel 204 is attached to the rear wheel shaft 214.

As shown in FIG. 19, the three-wheel vehicle is provided with the pivot for swinging the front frame 202 crosswise, however, the three-wheel vehicle is provided without a swinging shaft for vertically swinging the rear wheels 203, 204. When such a swinging shaft is provided, the number of parts is increased and the cost is increased.

As the right and left rear wheels 203, 204 are integrated via the rear wheel shaft 211, the intermediate shaft 212 and the rear wheel shaft 214 as shown in FIG. 20, the rear wheel 203 is lifted upward when one rear wheel 203 runs on a convex portion of a road, for example. The effect is transmitted to the other rear wheel 204 via the rear wheel shaft 211, the intermediate shaft 212 and the rear wheel shaft 214, the rear wheel 204 is inclined, the rear frame 205 shown in FIG. 19 is rolled and the front frame 202 is vertically moved by the roll. Such configuration causes little trouble in a vehicle when the displacement is small; however, when the displacement of which is moderate or high and if the vehicle is moving quickly, an improvement in ride comfort is desired.

The swinging shaft is separately provided on the right and on the left. A swing arm is respectively attached to these swinging shafts and the rear wheels 203, 204 are attached to these swing arms. Thus, the right and left rear wheels are made independent and the vertical motion of one of the rear wheels 203, 204 has no effect upon the other. However, since the swinging shafts are provided to the right and the left, the cost is increased.

An object of the invention is to reduce costs and provide enhanced ride comfort for a three-wheel vehicle provided with a swinging mechanism.

SUMMARY OF THE INVENTION

In one aspect of the present invention, a rear suspension system for a vehicle is provided. The suspension system comprises right and left suspension arms, right and left linking mechanisms, a shock absorber with two ends, and a swinging mechanism. Each suspension arm is coupled to a frame of the vehicle and a wheel of the vehicle. The suspension arms are coupled to the frame so that the suspension arms are capable of independent movement. Each linking mechanism is coupled to the respective suspension arm. One end of the shock absorber is coupled via the respective linking mechanism to the right arm and the other end of the shock absorber is coupled via the respective linking mechanism to the left arm. The swinging mechanism is coupled to the right and left linking mechanisms and to the frame of the vehicle. The swinging mechanism is configured to provide a damping force to restrict rotation of frame of the vehicle.

In another aspect of the invention, the linking mechanism comprises right and left linking arms and right and left bell cranks. Each bell crank is coupled to an end of the shock absorber, the respective linking arm, and to the swinging mechanism.

In yet another aspect of the invention, each bell crank is coupled to the swinging mechanism via a connecting member, and the connecting member is pivotably coupled to the frame of the vehicle.

In another aspect of the invention, a three-wheel vehicle with a suspension system is provided. The suspension system comprises a spindle extending in a longitudinal direction of the vehicle and attached to a body frame, the body frame being pivotably attached to the spindle. Right and left suspension arms are independently coupled to the spindle so that they are capable of pivoting about the spindle. Right and left rear wheels are attached to a right and left side of the body frame via the respective suspension arms. A swinging mechanism is coupled to the body frame and configured to restrict lateral rotation of the body frame and provided between the suspension arms and the body frame.

In yet another aspect of the invention, a three-wheel vehicle with a suspension system is provided. The suspension system comprises spindle means extending in a longitudinal direction of the vehicle for allowing rotation about an axis defined by the spindle means, right and left suspension means for coupling right and left rear wheels to a right and left side of the body frame, and swinging means for restricting lateral swing of the body frame. The spindle means is attached to a body frame with the body frame being capable of pivoting about the spindle means. The suspension means is pivotably coupled to the spindle. The swinging means is coupled to the body frame and provided between the suspension means and the body frame.

In one aspect of the present invention, a three-wheel vehicle provided with a swinging mechanism in which right and left rear wheels are attached to the right and the left of a body frame via suspension arms so that the rear wheels can be vertically moved and the swinging mechanism for allowing the lateral swing of the body frame for the side of the suspension arm is provided between the side of the suspension arm and the side of the body frame. A spindle extended in a longitudinal direction of the body is attached to the body frame. The right and left suspension arms are independently attached to the spindle so that the suspension arms can be vertically swung and the spindle also functions as a swinging shaft for swinging the body frame.

Each rear wheel can be independently vertically moved without lateral interference by supporting the right and left rear wheels by the spindle via the suspension arms mutually independent, compared with the conventional type in which the right and left rear wheels are coupled via an axle, for example. The ability of the right and left rear wheels to follow a road surface is increased, the roll of the body can be reduced and its ride comfort can be enhanced.

As the right and left suspension arms are attached to the same spindle, the number of parts can be reduced, compared with a case that right and left suspension arms are attached to separate swinging shafts. Thus, the cost can also be reduced.

Further, as the spindle also functions as a swinging shaft, the number of parts can be reduced, compared with a case that a spindle and a swinging shaft are separately provided, further reducing costs.

In another aspect of the present invention, a suspension arm is an A-type arm. As the suspension arm is A-type, the rigidity of the suspension arm can be enhanced and stability during operation can be enhanced.

BRIEF DESCRIPTION OF THE DRAWINGS

FIGS. 8(a), 8(b), and 8(c) illustrate the swinging mechanism according to the invention;

DETAILED DESCRIPTION OF THE INVENTION

As used herein, the term "coupled" means any structure or method that may be used to provide connectivity between two or more elements, which may or may not include a direct physical connection between the elements.

Figure 1:
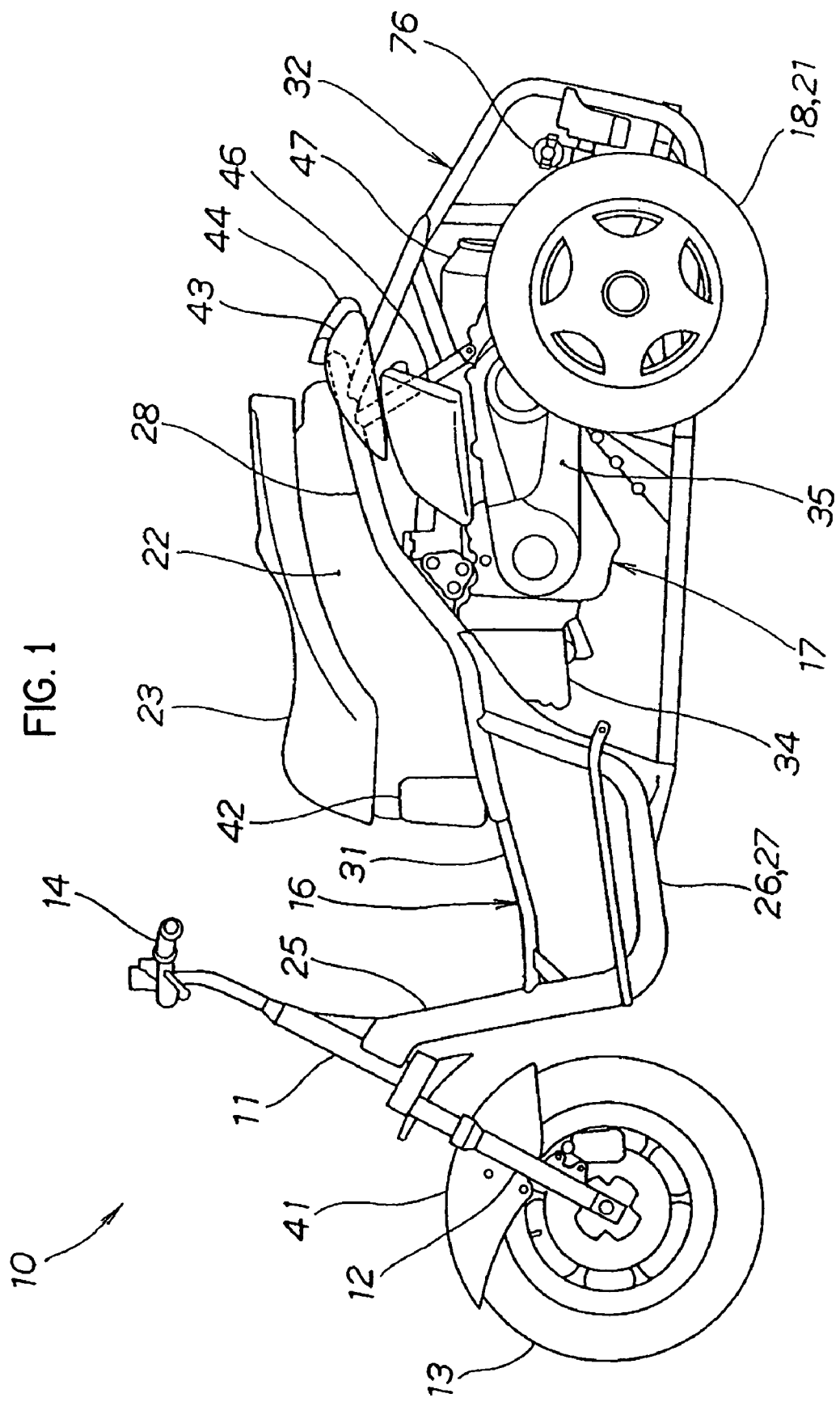
FIG. 1 is a side view showing a three-wheel vehicle provided with a swinging mechanism according to the invention.

An embodiment of the invention will be described based upon attached drawings below. FIG. 1 is a side view showing a three-wheel vehicle provided with a swinging mechanism according to the invention. The three-wheel vehicle provided with the swinging mechanism 10 (hereinafter called the three-wheel vehicle 10) is composed of a front fork 12 steerably attached to a head pipe 11 via a steering shaft (not shown), a front wheel 13 attached to the lower end of the front fork 12, a handlebar 14 integrated with the front fork 12, a body frame 16 attached to the rear of the head pipe 11, a power unit 17 attached to the rear of the body frame 16, right and left rear wheels 21, 18 driven by the power unit 17, a housing box 22 attached to an upper part of the body frame 16 and a seat 23 openably attached to an upper part of the housing box 22.

The body frame 16 is composed of a down pipe 25 extended backward and diagonally downward from the head pipe 11, a pair of right and left lower pipes 27, 26 extended backward from a lower part of the down pipe 25 and further, extended backward and diagonally upward, a center upper frame 28 coupled to the respective rears of these lower pipes 27, 26 a center pipe 31 extended backward from the down pipe 25 and coupled to the center upper frame 28 and a J-shaped frame 32 when it is viewed from the side coupled to the rear of each lower pipe 27, 26 and the rear side of the center upper frame 28.

The center upper frame 28 is a member for supporting the housing box 22 and suspending the power unit 17.

The J-shaped frame 32 is a member for attaching a rear suspension that suspends the rear wheels 18, 21 and the swinging mechanism allowing a lateral swing on the side of the body frame 16 for the side of the rear suspension. The rear suspension and the swinging mechanism will be described in detail later.

The power unit 17 is composed of an engine 34 arranged on the front side of the body and a transmission mechanism 35 that transmits the power of the engine 34 to the rear wheels 18, 21.

A reference number 41 denotes a front fender that covers the front wheel 13, 42 denotes a battery, 43 denotes a blinker, 44 denotes a tail lamp, 46 denotes an air cleaner and 47 denotes a muffler.

Figure 2:
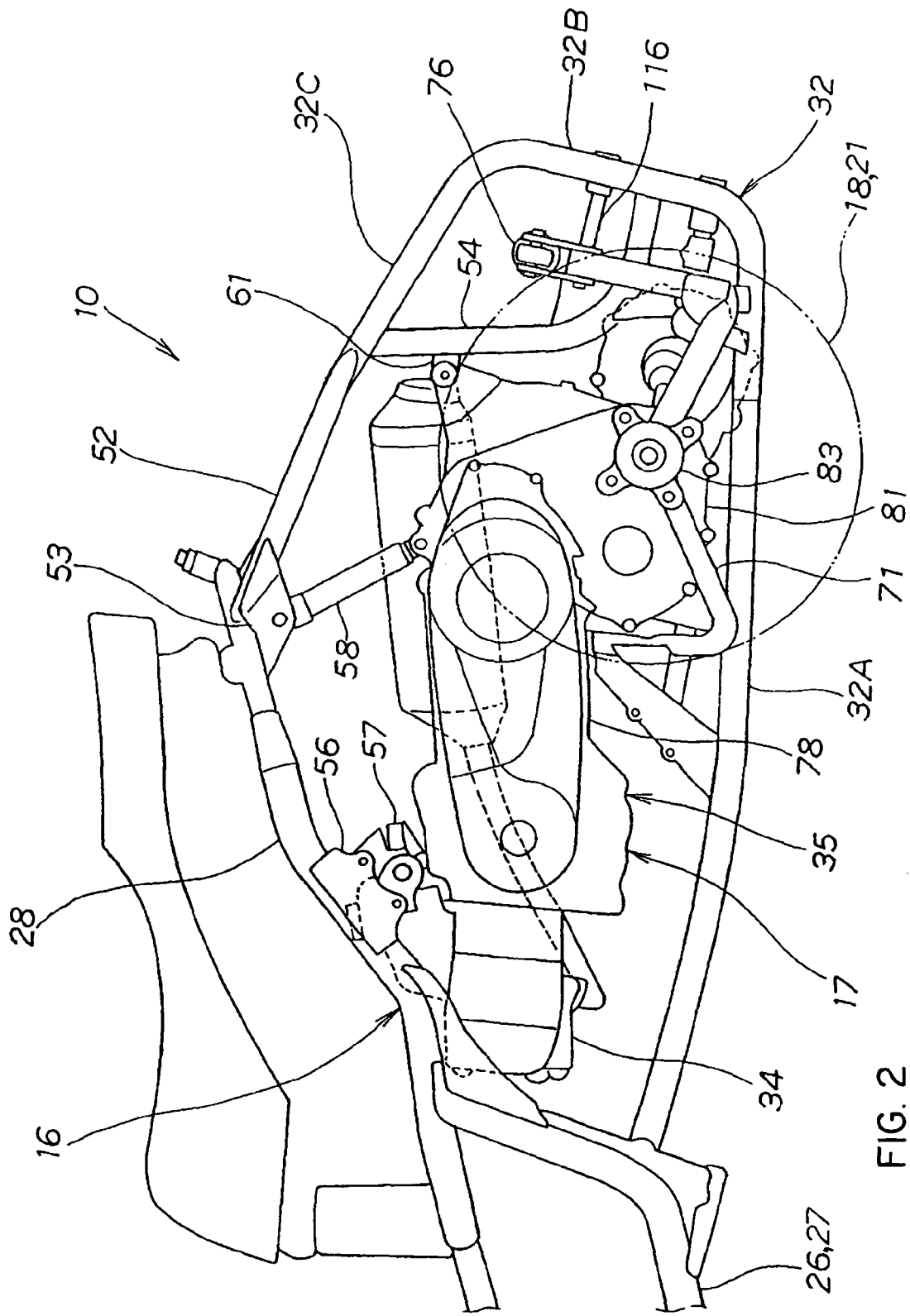
FIG. 2 is a side view showing a main part of the three-wheel vehicle according to the invention.

FIG. 2 is a side view showing a main part of the three-wheel vehicle according to the invention. FIG. 2 shows that the rear of the power unit 17 is supported by laying each coupling pipe 52, 52 (the inside coupling pipe 52 is not shown) between the J-shaped frame 32 and the center upper frame 28 to couple an upper part of the J-shaped frame 32 and the rear ends of the center upper frame 28, attaching each reinforcing plate 53, 53 to each coupling pipe 52, 52 and the center upper frame 28, attaching an L-type pipe 54 of substantially an L type when it is viewed from the side to the inside of the rear of the J-shaped frame 32, attaching brackets 56, 56 (the inside bracket 56 is not shown) to the center upper frame 28, attaching an upper part of the front of the power unit 17 to these brackets 56, 56 via an intermediate member 57 and extending a supporting rod 58 from the reinforcing plates 53, 53 downward and diagonally backward. FIG. 2 shows that the rear end of the power unit 17 is attached by extending a projection 61 from the front of the L-type pipe 54 forward. Reference numbers 32A, 32B, 32C denote a substantially horizontal lower horizontal part of the J-shaped frame 32, an inclined part at the rear end the upper end side of which is extended at the back of the lower end side and an upper inclined part the front end of which is higher than the rear end.

Figure 3:
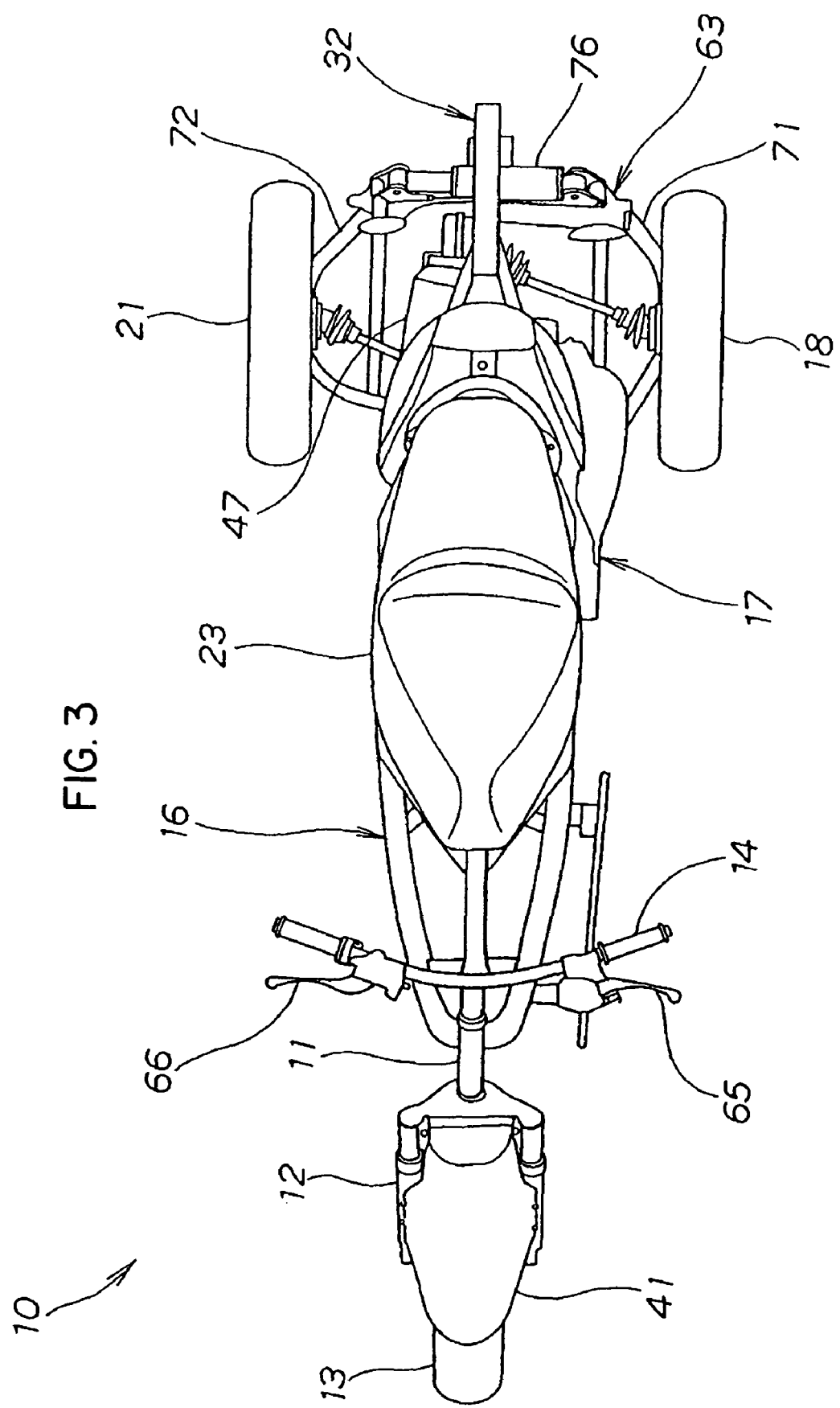
FIG. 3 is a plan view showing the three-wheel vehicle according to the invention.

FIG. 3 is a plan view showing the three-wheel vehicle according to the invention and shows that the rear of the J-shaped frame 32 is formed by one pipe and a rear suspension 63 (the details will be described later) is attached to the J-shaped frame 32. A reference number 65 denotes a brake lever for the rear wheel and 66 denotes a brake lever for the front wheel.

Figure 4:
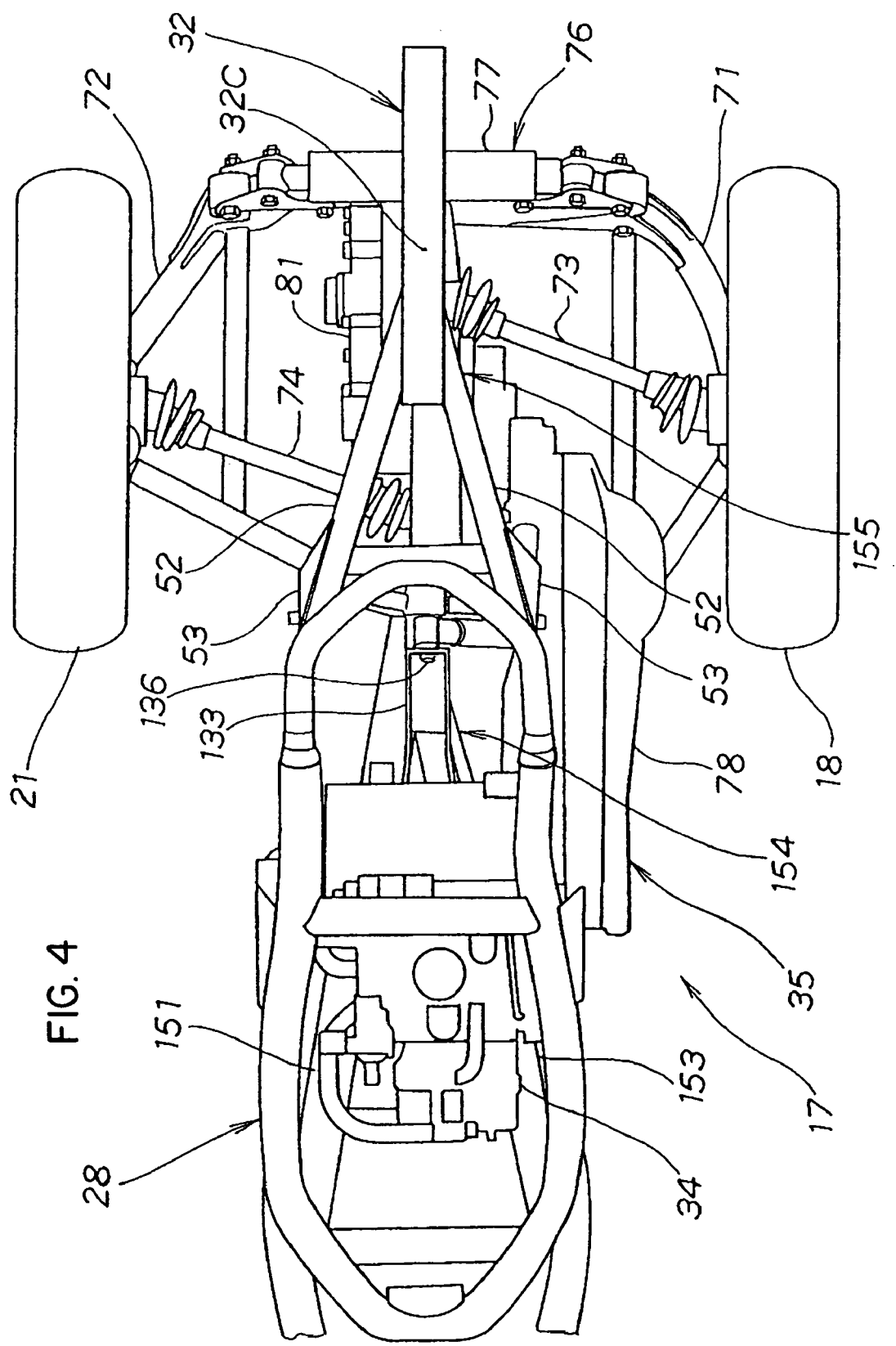
FIG. 4 is a plan showing the main part of the three-wheel vehicle according to the invention.

FIG. 4 is a plan view showing a main part of the three-wheel vehicle according to the invention. FIG. 4 shows structure that suspension arms 71, 72 are attached to the right and the left of the J-shaped frame 32, holders (not shown) are attached to the ends of these suspension arms 71, 72, the rear wheels 18, 21 are rotatably attached to these holders and these rear wheels 18, 21 are driven by drive shafts 73, 74 extended from transmission mechanism 35 of the power unit 17.

Reference number 76 denotes a shock absorber as resilient means composed of a damper 77 and a helical compression spring (not shown) and the shock absorber is coupled to the respective sides of the right and left suspension arms 72, 71.

The center upper frame 28 is a circular or a substantially elliptic member and the housing box 22 (see FIG. 1) having a substantially similar bottom is attached to its upper part.

The transmission mechanism 35 of the power unit 17 is composed of a belt-type continuously variable transmission 78 extended backward from the rear of the left of the engine 34 and a gear box 81 coupled to the rear of the continuously variable transmission 78, the drive shaft 74 is connected to the output shaft on the front side of the gear box 81 and the drive shaft 73 is connected to the output shaft on the rear side of the gear box 81.

Figure 5:
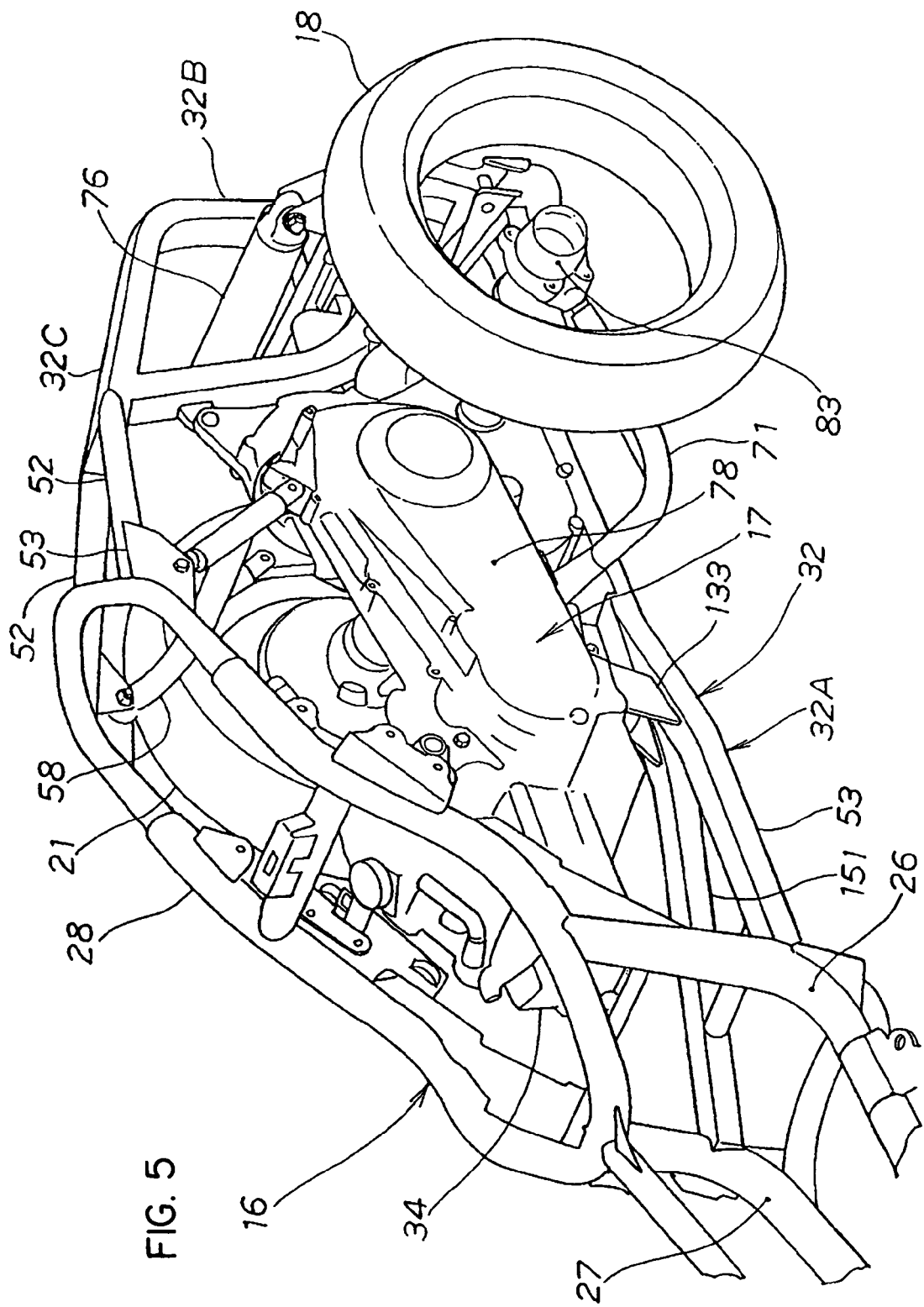
FIG. 5 is a first perspective view showing the three-wheel vehicle according to the invention.

FIG. 5 is a first perspective view showing the three-wheel vehicle according to the invention and shows that the front of the J-shaped frame 32 is attached to the respective rears of the lower pipes 26, 27 of the body frame 16. A reference number 83 denotes a holder (the inside holder 83 is not shown).

Figure 6:
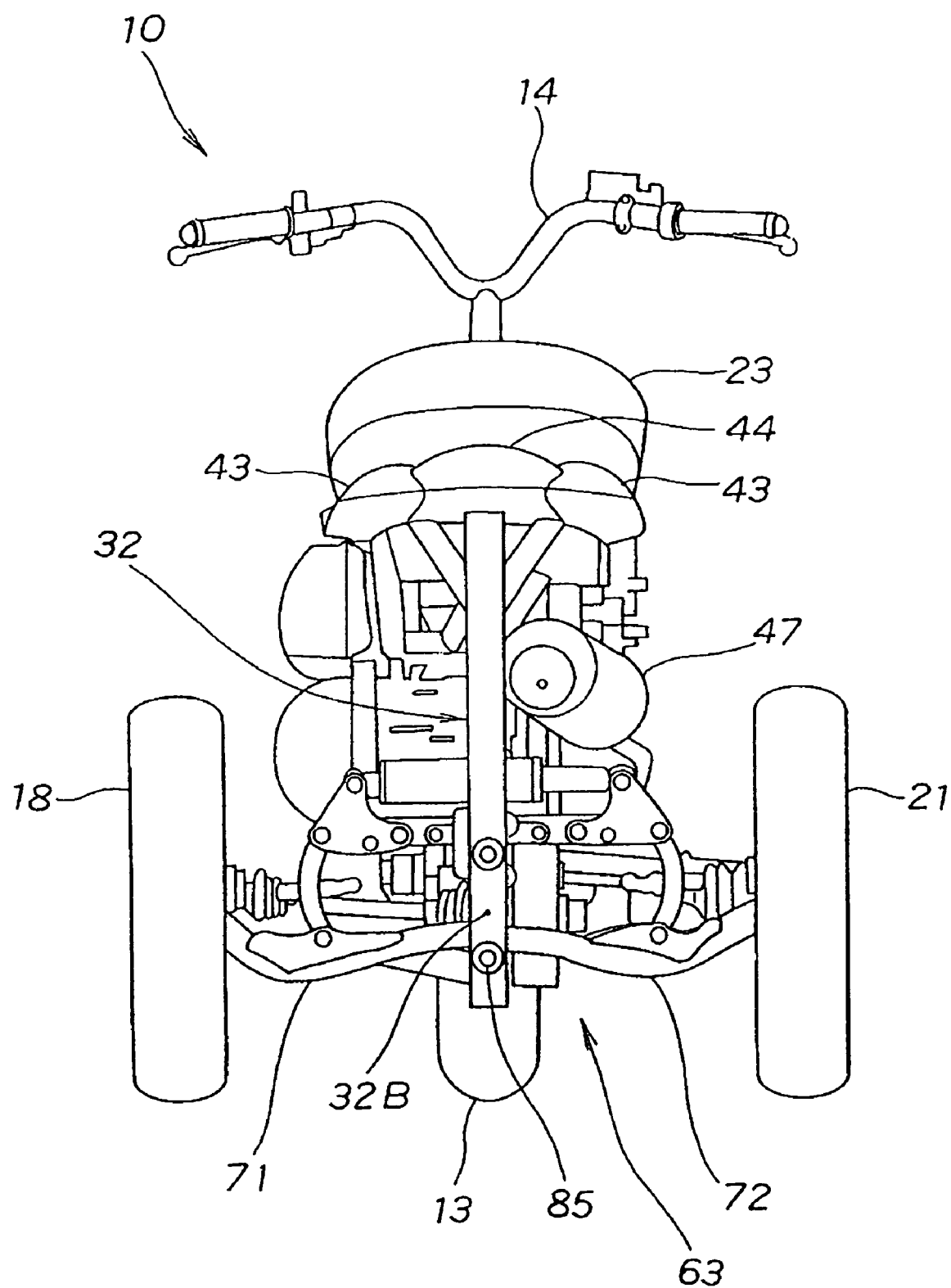
FIG. 6 is a back view showing the three-wheel vehicle according to the invention.

FIG. 6 is a back view showing the three-wheel vehicle according to the invention, the inclined part at the rear end 32B of the J-shaped frame 32 is a substantially perpendicular part in a state in which nobody rides on the three-wheel vehicle 10 and the rears of the suspension arms 71, 72 are attached to the inclined part at the rear end 32B. A reference number 85 denotes a rear swing shaft for swingably attaching the rears of the suspension arms 71, 72 to the inclined part at the rear end 32B.

Figure 7:
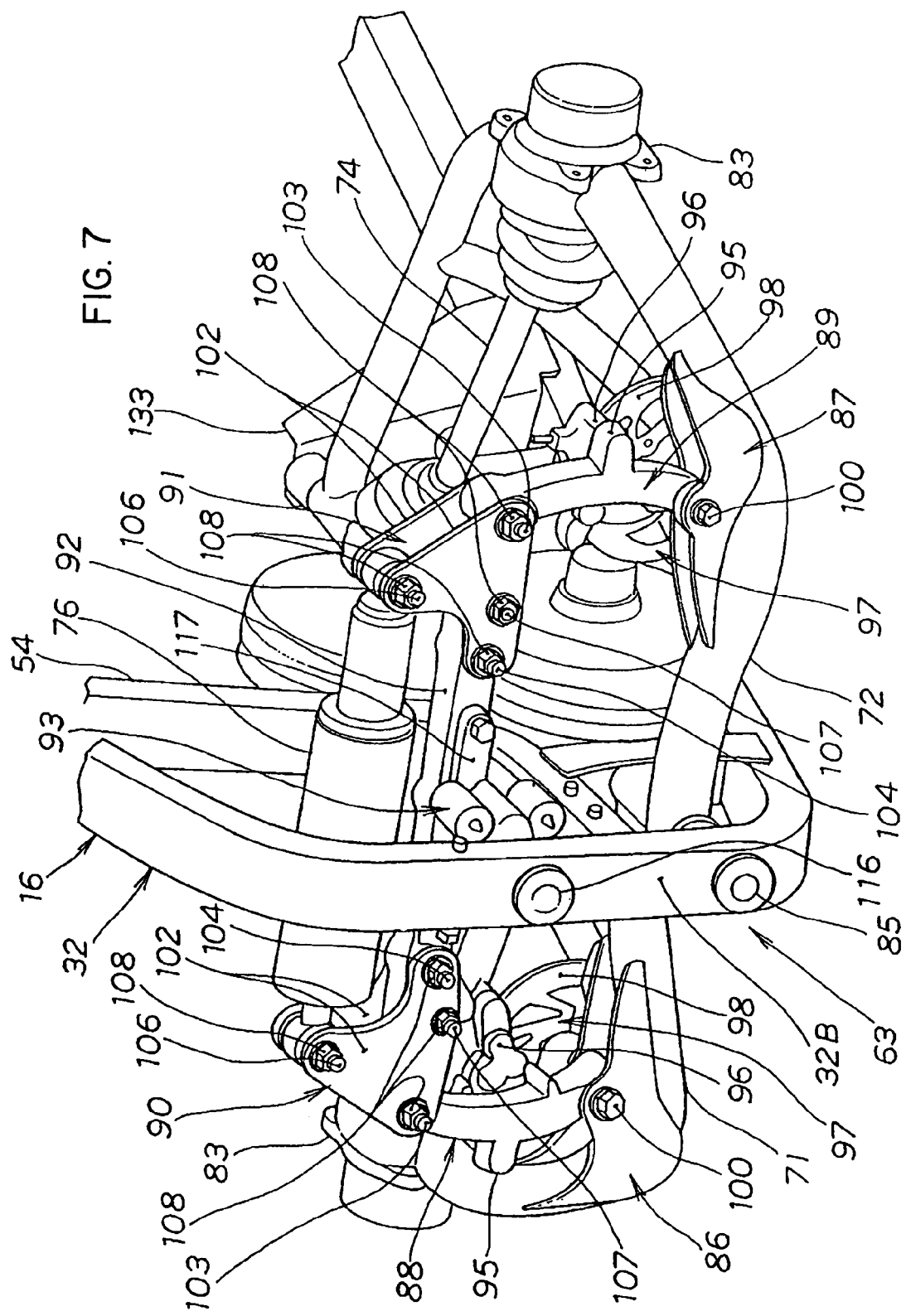
FIG. 7 is a second perspective view showing the three-wheel vehicle according to the invention.

FIG. 7 is a second perspective view showing the three-wheel vehicle according to the invention and shows the rear suspension 63 in which the suspension arms 72, 71 are extended right and left from the J-shaped frame 32, the holders 83 are attached to the respective ends of these suspension arms 72, 71, arc-shaped links 89, 88 as a coupling means are swingably attached to the respective upper parts of the suspension arms 72, 71 via mounting brackets 87, 86, bell cranks 91, 90 as a coupling means of a substantially L type when they are viewed from the side are swingably attached to the respective ends of these arc-shaped links 89, 88, the shock absorber 76 is laid between the respective upper ends of these bell cranks 91, 90, a bar-shaped connecting member 92 is laid between the respective ends of the sides of the bell cranks 91, 90 and the connecting member 92 is attached to the inclined part at the rear end 32B of the J-shaped frame 32 via the swinging mechanism 93.

The arc-shaped links 88, 89 are respectively provided with a side protruded part 95 in the middle and brake calipers 96, 96 for braking each swing of the arc-shaped links 88, 89 are attached to these side protruded parts 95. Reference numbers 97, 97 denote a braking device provided with the brake caliper 96 and each disc 98, 98 is held between the brake calipers 96, 96 by oil pressure. The discs 98, 98 are members attached to the suspension arms 71, 72. A reference number 100 denotes a bolt that functions as each swinging shaft of the arc-shaped links 88, 89.

Each bell crank 90, 91 is composed of two crank plates 102, 102 and is provided with a first bolt 103 as a first fulcrum, a second bolt 104 as a second fulcrum and a third bolt 106 as a third fulcrum. A reference number 107 denotes a fourth bolt as a stopper pin for regulating the stretch of the shock absorber 76 and 108 (note that certain elements occur in plurality as shown in the figures) denote a nut screwed on the first bolt 103 to the fourth bolt 107.

The swinging mechanism 93 is a member for allowing the rightward and leftward swings of the body frame 16 for the suspension arms 71, 72 in cornering, increasing reaction force with included elasticity as the inclination of the swing becomes large and returning the body frame to an original position.

FIGS. 8A to 8C are drawings that illustrate the swinging mechanism according to the invention, FIG. 8A is a side view (a partial sectional view), FIG. 8B is a sectional view viewed along a line b-b in FIG. 8A and FIG. 8C shows action in FIG. 8B.

As shown in FIG. 8A, the swinging mechanism 93 is so-called "Neidhart damper" composed of a case 111 attached to the inclined part at the rear end 32B of the J-shaped frame 32 and the rear of the L-type pipe 54, damper rubbers 112 housed in the case 111, a pressing member 113 attached to the connecting member 92 for pressing these damper rubbers 112 and a through pin 116 which pierces the pressing member 113 and the connecting member 92 and both ends of which are supported by an end support 114 provided to the L-type pipe 54 and the inclined part at the rear end 2B. Reference number 117 denotes an attachment provided to the pressing member 113 to bolt the pressing member 113 on the connecting member 92, and 118 denotes a swing regulator integrated with the end support 114 to regulate the swing of the connecting member 92.

As shown in FIG. 8B, the case 111 is a member including a left case 121 and a right case 122, a damper housing 123 is provided to the inside, the damper rubbers 112 are arranged at the four corners of the damper housing 123 and are pressed by convex pressing parts 124 of the pressing member 113.

As shown in FIG. 8C, the body frame 16 is swung on the left of the body (an arrow left in FIG. 8C shows the left of the body) for the connecting member 92 coupled to the side of the suspension arm, when the L-type pipe 54 is inclined by an angle θ, the case 111 of the swinging mechanism 93 is relatively revolved with the pressing member 113, the damper rubbers 112 housed in the case 111 are compressed between the case 111 and the pressing member 113 and reactive force that tries to return the case 111 and further, the body frame 16 to each original position (each position shown in FIG. 8A) generates.

Figure 9:
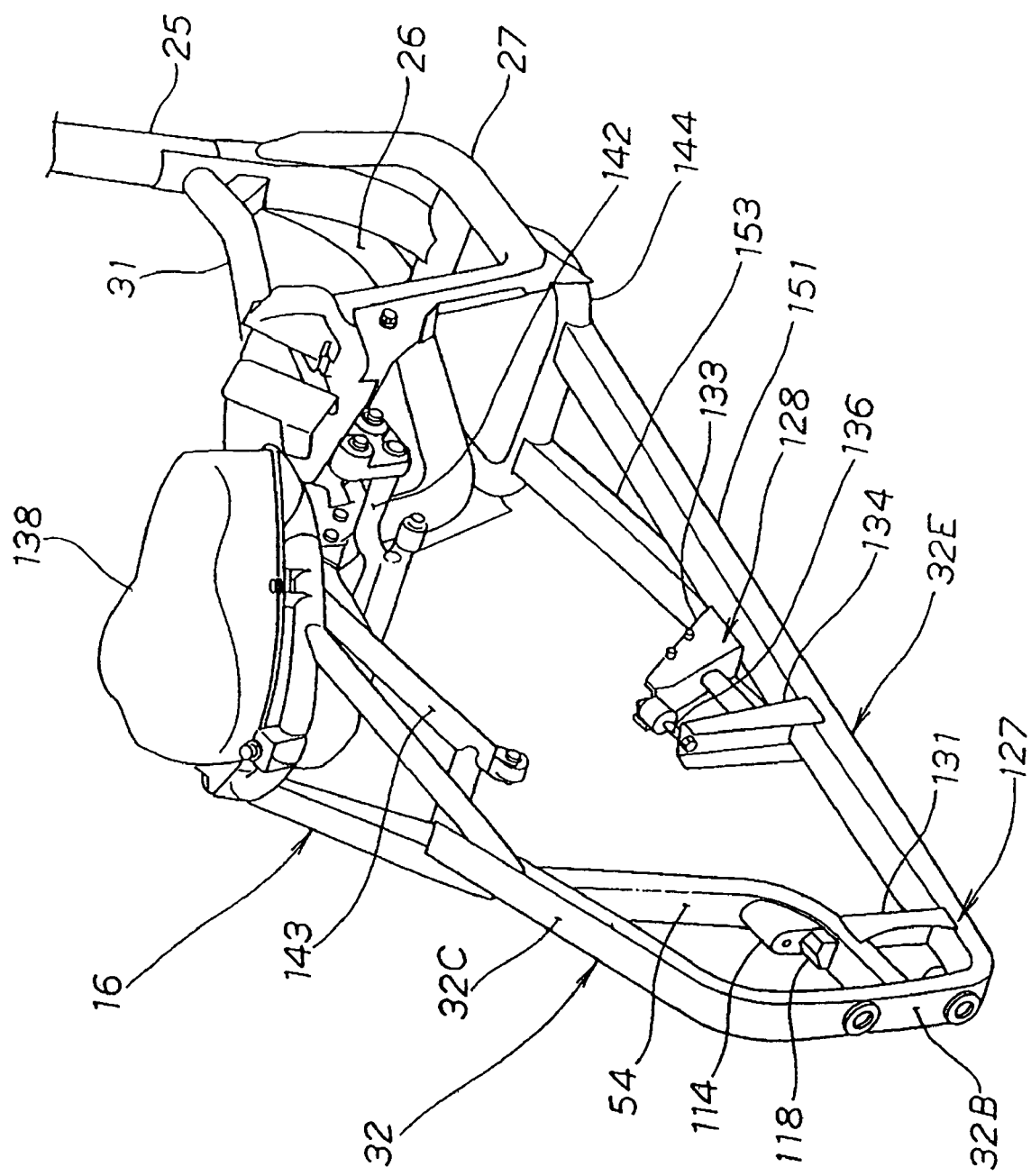
FIG. 9 is a third perspective view showing the three-wheel vehicle according to the invention.

FIG. 9 is a third perspective view (diagonally viewed from the rear of the body frame) showing the three-wheel vehicle according to the invention and shows that rear fittings 127 for swingably attaching the respective rears of the suspension arms 71, 72 (see FIG. 7) and front fittings 128 for swingably attaching the respective fronts of the suspension arms 71, 72 are provided to the J-shaped frame 32.

The rear fittings 127 are composed of the inclined part at the rear end 32B and a vertical bracket 131 connecting the L-type pipe 54 and a lower horizontal part 32E (described later), and the rear swing shaft 85 (see FIG. 6) for supporting the respective rears of the suspension arms 71, 72 is attached to the inclined part at the rear end 32B and the vertical bracket 131.

The front fittings 128 is composed of a front stand 133 and a rear stand 134 which stand at an interval on the lower horizontal part 32E and a front swing shaft 136 for supporting the respective fronts of the suspension arms 71, 72 is attached to the front stand 133 and the rear stand 134.

Reference number 138 denotes a fuel tank, 142 and 143 denote an engine mounting vibration insulating link for mounting the engine 34 on the body frame 16 and 144 denotes a U-shaped pipe attached to a lower part of each rear of the lower pipes 26, 27 to attach the end of the lower horizontal part 32E of the J-shaped frame 32.

FIG. 5 shows the embodiment that the front ends of the lower horizontal part 32A branched in a Y type are directly attached to the lower pipes 26, 27, however, FIG. 9 shows another embodiment that the J-shaped frame 32 is composed of the lower horizontal part 32E branched in a Y type, the inclined part at the rear end 32B and an upper inclined part 32C and the front ends of the lower horizontal part 32E are attached to the lower pipes 26, 27 via the U-shaped pipe 144.

Figure 10:
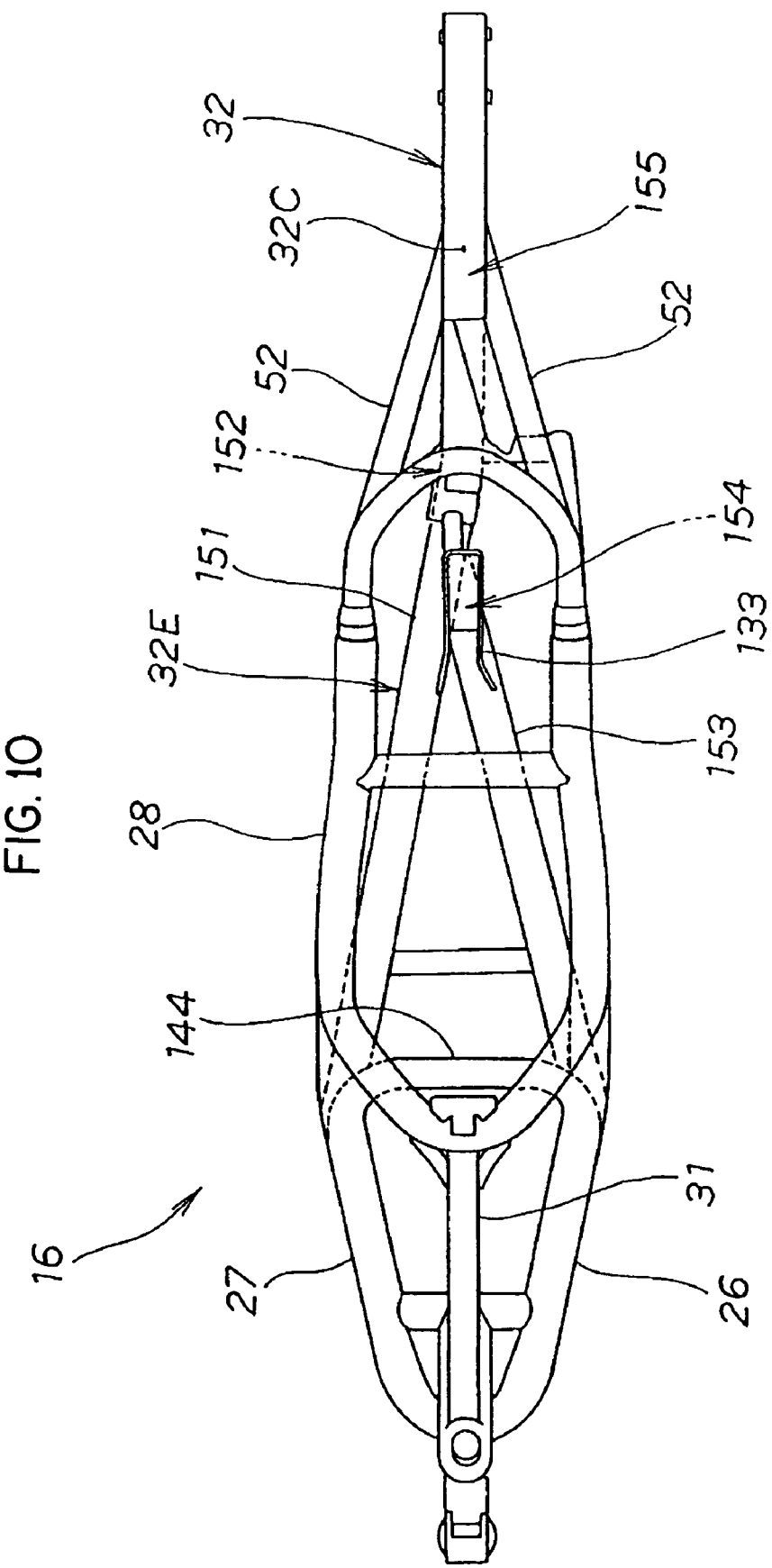
FIG. 10 is a plan view showing a body frame according to the invention.

FIG. 10 is a plan showing the body frame according to the invention and shows that the lower horizontal part 32E of the J-shaped frame 32 is branched in a Y type halfway, the branched parts are coupled to the rear of the U-shaped pipe 144 and the coupling pipes 52, 52 are extended in a Y type from the upper inclined part 32C of the J-shaped frame 32 to the center upper frame 28.

The lower horizontal part 32E (and the lower horizontal part 32A (see FIG. 5)) are formed by bending one long first pipe 151 halfway and connecting a second pipe 153 to the vicinity of a bended part 152 of the first pipe 151. Reference number 154 denotes a Y-type branched part acquired by connecting the second pipe 153 to the first pipe 151 and branching in a Y type, and 155 denotes a Y-type branched part acquired by connecting the coupling pipes 52, 52 to the upper inclined part 32C and branching in a Y type.

The first pipe 151 is a member including the inclined part at the rear end 32B and the upper inclined part 32C and is acquired by removing the second pipe 153 from the J-shaped frame 32.

The connection of the front of a lower part of the J-shaped frame 32 and the U-shaped pipe 144 can be enhanced by forming the lower horizontal part 32E in the Y type as described above and the connection of an upper part of the rear of the J-shaped frame 32 and the rear of the center upper frame 28 can be enhanced by arranging the coupling pipes 52, 52 in the Y type. The connection of the front of the lower part of the J-shaped frame 32 and the lower pipes 26, 27 can be enhanced by forming the lower horizontal part 32A in the Y type as shown in FIG. 5.

Figure 11:
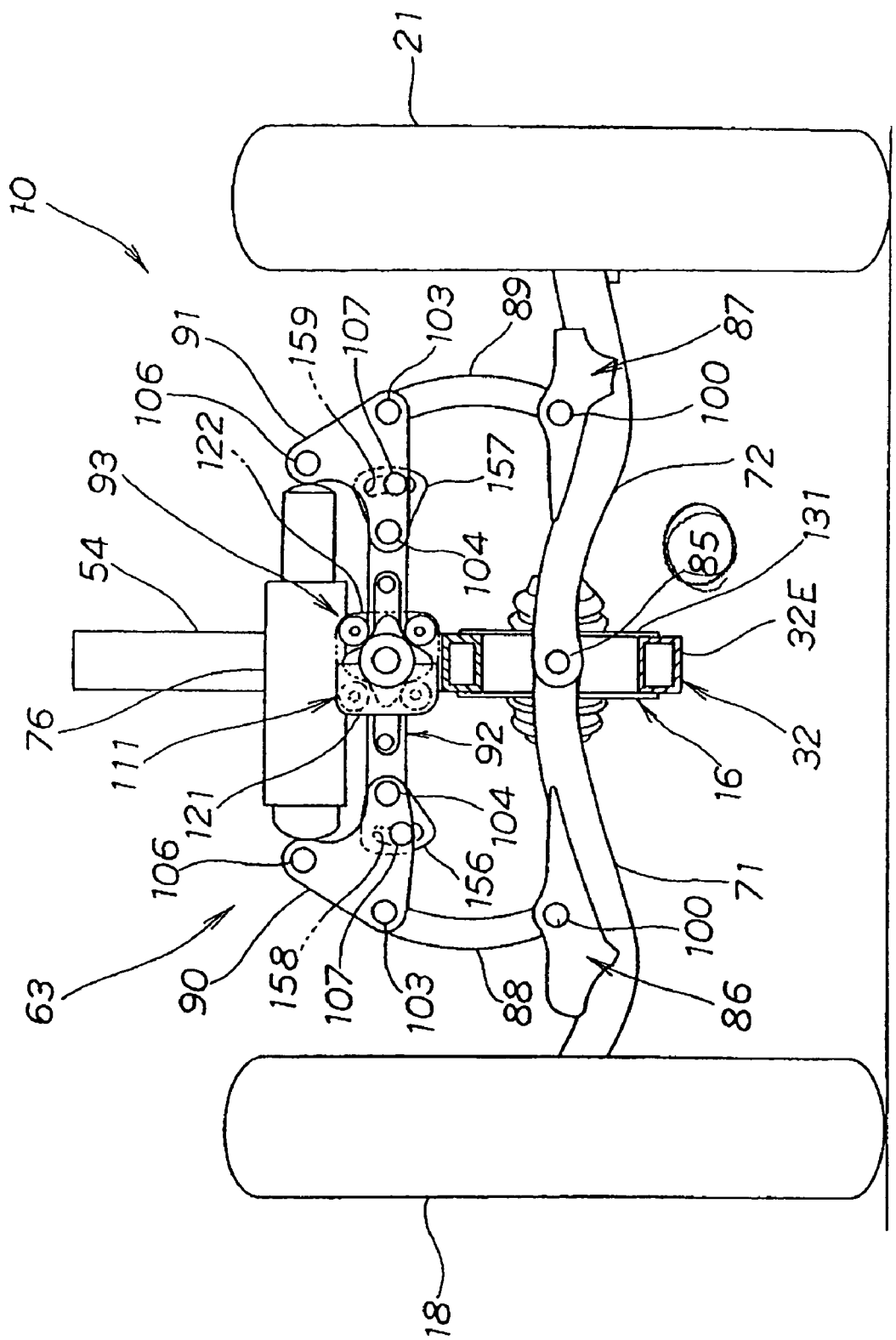
FIG. 11 is a back view showing a rear suspension according to the invention.

FIG. 11 is a back view showing the rear suspension according to the invention and shows the rear suspension 63 in a state in which a rider rides the three-wheel vehicle. The inclined part at the rear end 32B and the upper inclined part 32C of the J-shaped frame 32 respectively shown in FIG. 9 are omitted. The right case 122 of the swinging mechanism 93 shown in FIG. 8B is shown by an imaginary line. At this time, the L-type pipe 54 of the body frame 16 is substantially vertical and the connecting member 92 is substantially horizontal.

The connecting member 92 is a member provided with fan-type parts 156, 157 to each of which each arc-shaped long hole 158, 159 is provided at both ends and the inclination angle of each bell crank 90, 91 with the connecting member 92 is regulated by piercing each fourth bolt 107, 107 as a stopper pin in each arc-shaped long hole 158, 159. The inclination angle of the bell cranks 90, 91 varies depending upon the inclination angle of the suspension arms 71, 72, that is, quantity in which the rear wheels 18, 21 are vertically moved. In other words, the arc-shaped long holes 158, 159 regulate the amount in which the rear wheels 18, 21 can vertically move.

Figure 12:
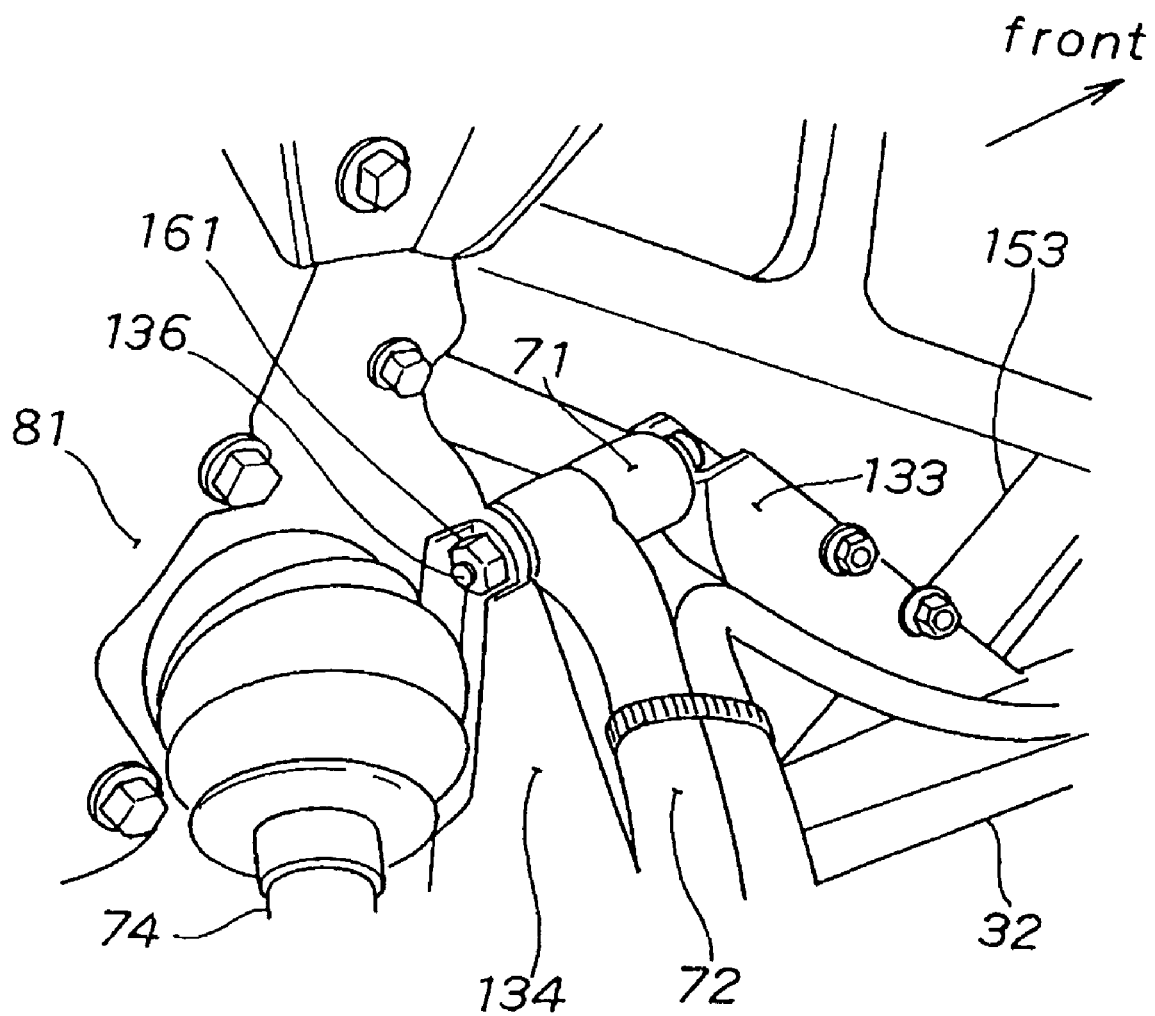
FIG. 12 is a perspective view showing a state in which the respective fronts of the suspension arms according to the invention are attached.
Figure 13:
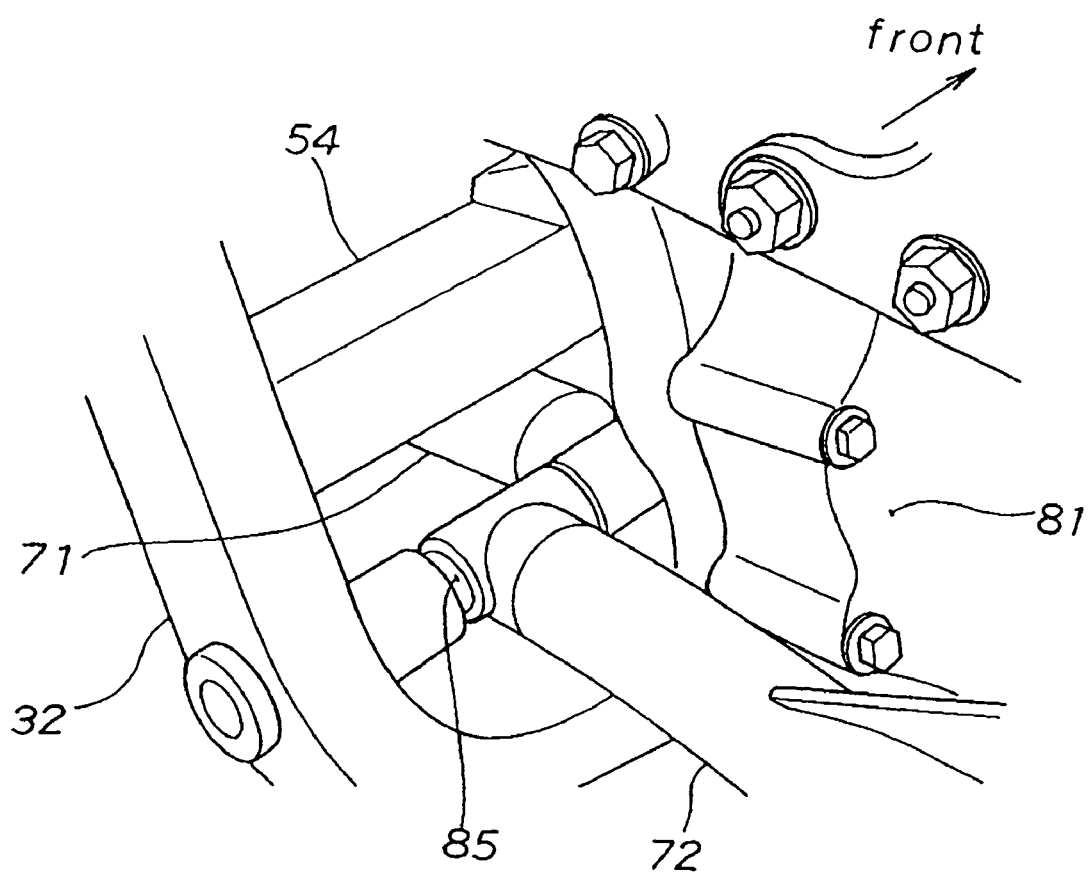
FIG. 13 is a perspective view showing a state in which the respective rears of the suspension arms according to the invention are attached.

FIG. 12 is a perspective view showing a state in which the respective fronts of the suspension arms according to the invention are attached (arrows labeled as "front" in FIGS. 12 and 13 shows a direction toward the front of the body). The end of each front of the suspension arms 71, 72 is turnably attached to the front swinging shaft 136 so that the suspension arm 72 is located at the back of the suspension arm 71.

The front swinging shaft 136 is a bolt piercing the front stand 133 and the rear stand 134 and a nut 161 is screwed at the end.

FIG. 13 is a perspective view showing a state in which the respective rears of the suspension arms according to the invention are attached and shows that the end of each rear of the suspension arms 71, 72 is turnably attached to the rear swinging shaft 85 so that the suspension arm 72 is located at the back of the suspension arm 71.

The action of the above-mentioned rear suspension 63 will be described below.

Figure 14:
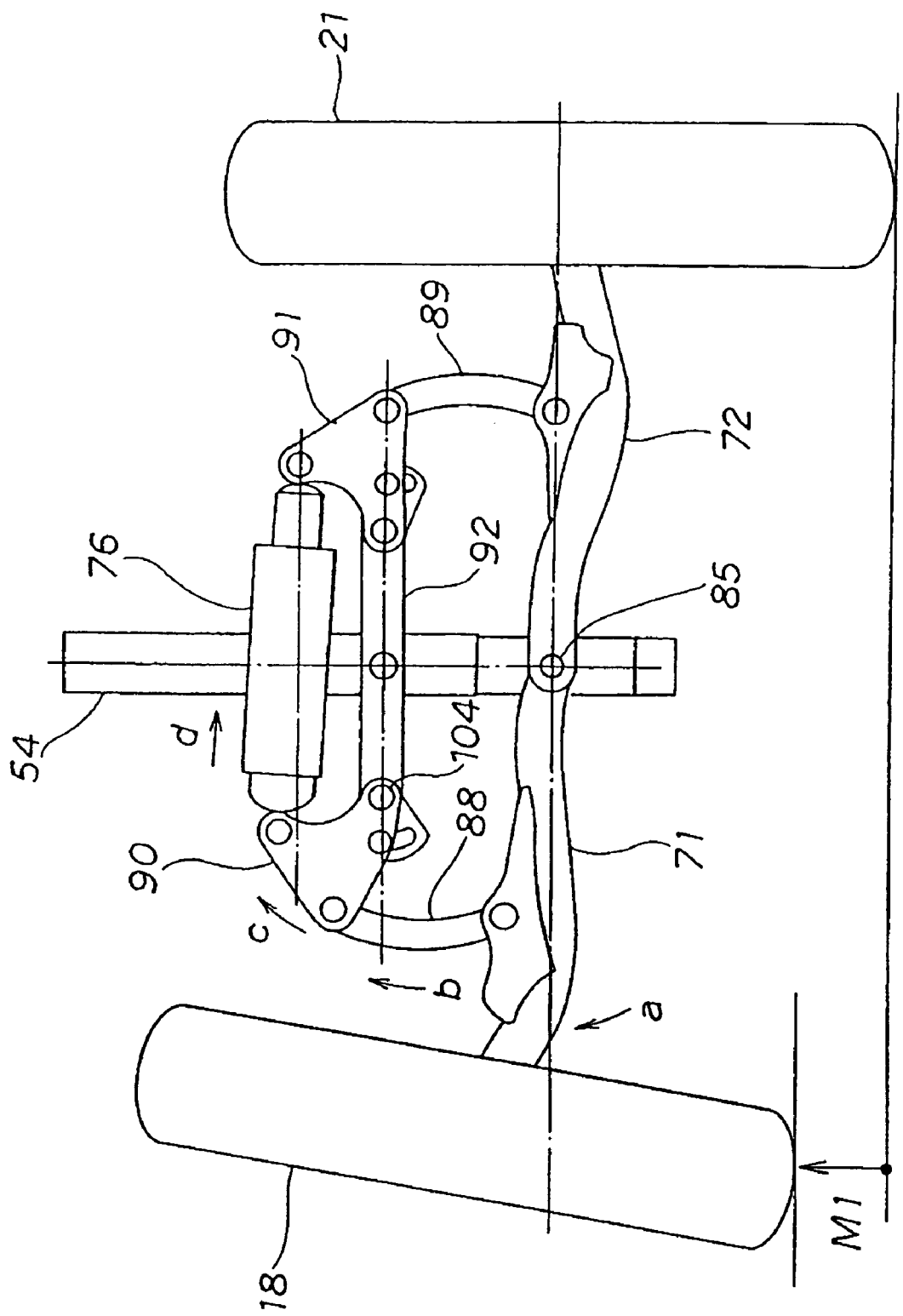
FIG. 14 shows a first action of the rear suspension according to the invention.

FIG. 14 shows the first action of the rear suspension according to the invention.

For example, when the left rear wheel 18 is moved upward by the amount of movement M1 from a state shown in FIG. 11, the suspension arm 71 is swung upward as shown by an arrow a with the rear swing shaft 85 and the front swing shaft 136 (see FIG. 9) in the center, hereby the arc-shaped link 88 is lifted as shown by an arrow b, the bell crank 90 is swung in a direction shown by an arrow c with the second bolt 104 as a fulcrum and the shock absorber 76 is pressed and contracted in a direction shown by an arrow d. Hereby, the transmission of shock caused by the lifting of the left rear wheel 18 to the side of the body frame 16 (see FIG. 10) is reduced.

At this time, as the other suspension arm 72 is in the same state as that shown in FIG. 11, the connecting member 92 is in a substantially horizontal state as in FIG. 11.

Figure 15:
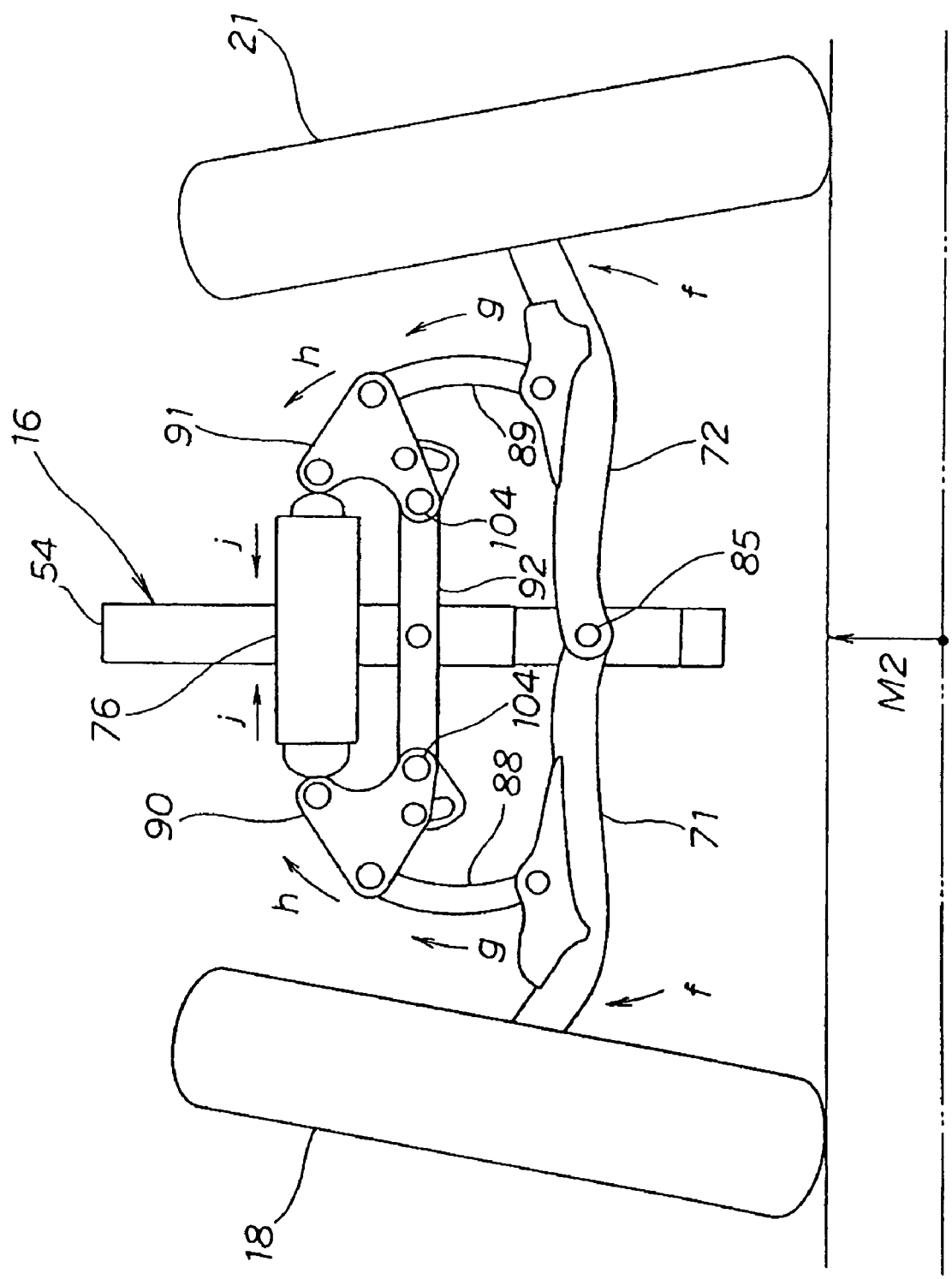
FIG. 15 shows a second action of the rear suspension according to the invention.

FIG. 15 shows the second action of the rear suspension according to the invention.

When the rear wheels 18, 21 are both lifted by the amount of movement M2 or the body frame 16 is lowered by the amount of movement M2 for the rear wheels 18, 21 from the state shown in FIG. 11, the suspension arms 71, 72 are swung upward as shown by arrows f, f with the rear swing shaft 85 and the front swing shaft 136 (see FIG. 9) in the center, hereby the arc-shaped links 88, 89 are lifted as shown by arrows g, g, make bell cranks 90, 91 swing in each direction shown by arrows h, h with the second bolt 104 as a fulcrum and press and contract the shock absorber 76 as shown by arrows j, j. As a result, buffer action is made by the shock absorber 76.

Figure 16:
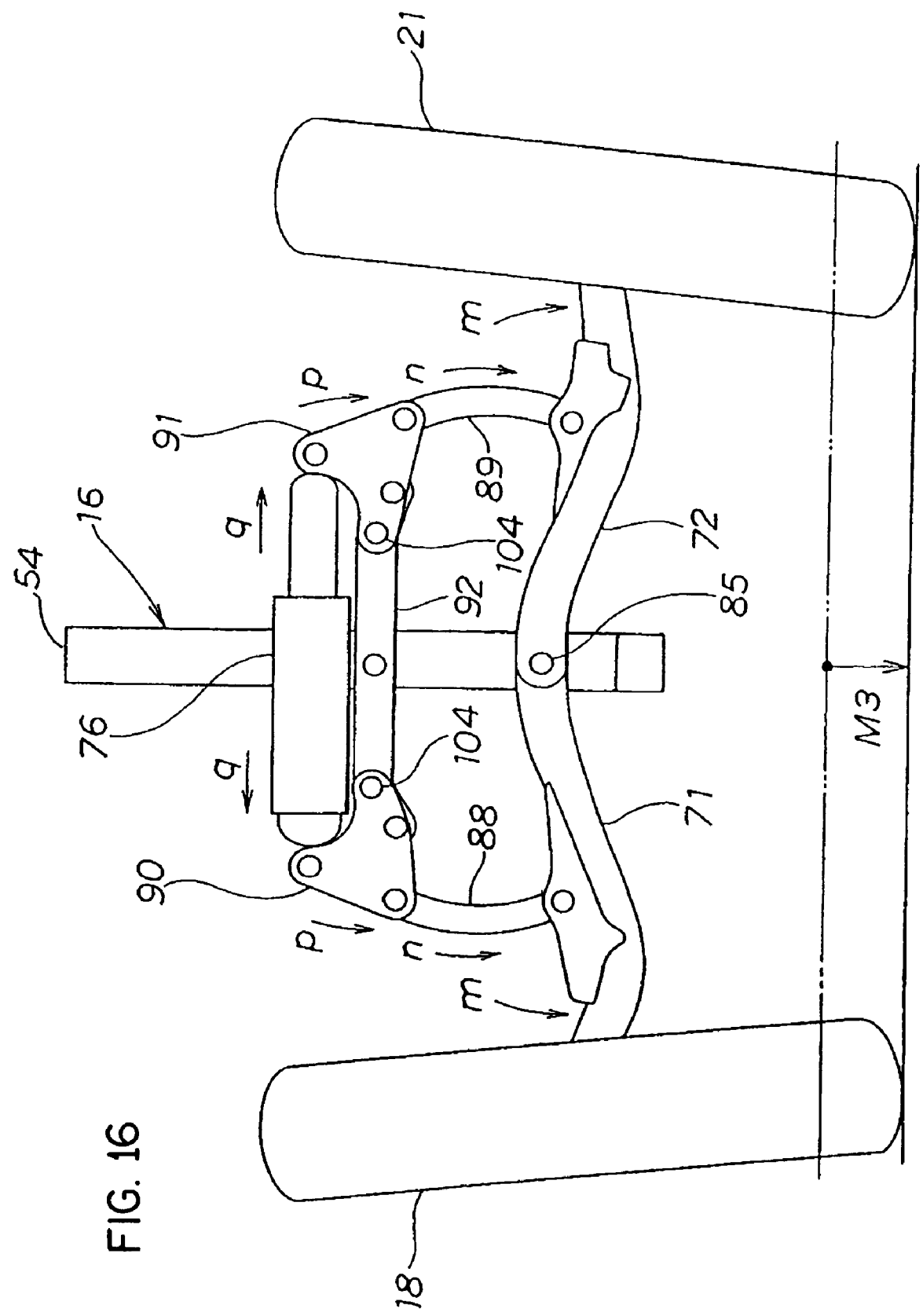
FIG. 16 shows a third action of the rear suspension according to the invention.

FIG. 16 shows the third action of the rear suspension according to the invention.

When the rear wheels 18, 21 are both lowered by the amount of movement M3 or the body frame 16 is lifted by the amount of movement M3 for the rear wheels 18, 21 from the state shown in FIG. 11, the suspension arms 71, 72 are swung downward as shown by arrows m, m with the rear swing shaft 85 and the front swing shaft 136 (see FIG. 9) in the center, hereby the arc-shaped links 88, 89 are lowered as shown by arrows n, n, make the bell cranks 90, 91 swing in each direction shown by arrows p, p with the second bolt 104 as a fulcrum and extend the shock absorber 76 as shown by arrows q, q. As a result, buffer action is made by the shock absorber 76.

Figure 17:
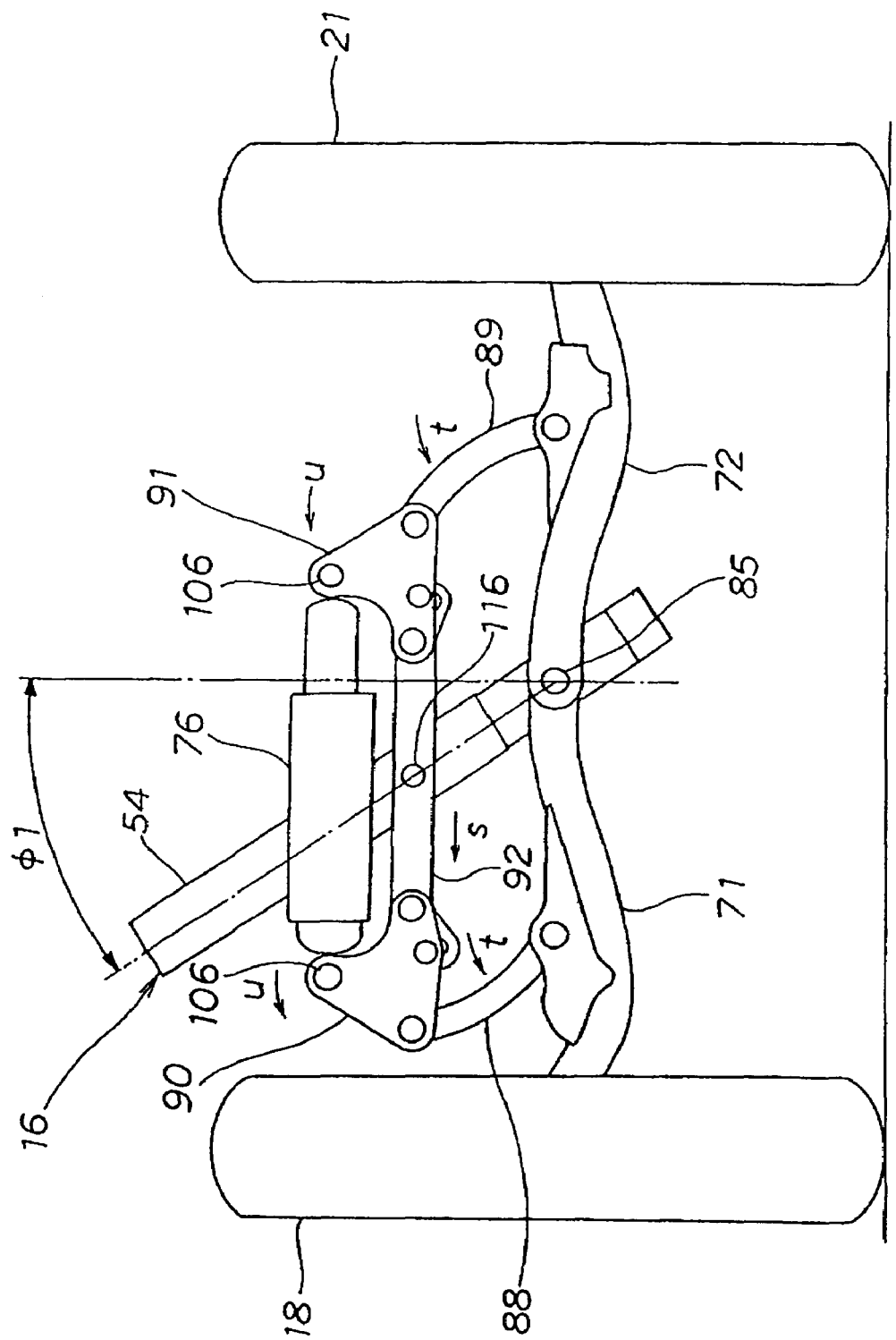
FIG. 17 shows a fourth action of the rear suspension according to the invention.

FIG. 17 shows the fourth action of the rear suspension according to the invention.

When the body frame 16, the L-type pipe 54 in this case is swung by an angle $\phi 1$ on the left side of the body from the state shown in FIG. 11, the connecting member 92 coupled to the L-type pipe 54 via the through pin 116 is moved in parallel leftward as shown by an arrow s. Hereby, the arc-shaped links 88, 89 are inclined as shown by arrows t, t and the bell cranks 90, 91 are moved in parallel as shown by arrows u, u. As an interval between the third bolts 106, 106 of the bell cranks 90, 91 is unchanged, the shock absorber 76 is not extended/contracted.

As at this time, the body frame 16 is swung for the connecting member 92, reaction force that tries to return the body frame 16 to the original position (that is, the position shown in FIG. 11) by the swinging mechanism generates as shown in FIG. 8C.

As described above, the body frame 16 is swung with the front swinging shaft 136 (see FIG. 12) and the rear swinging shaft 85 respectively swingably supporting the suspension arms 71, 72 in the center. As described above, the front swinging shaft 136 and the rear swinging shaft 85 function as a swinging shaft for swinging the body frame 16.

Figure 18:
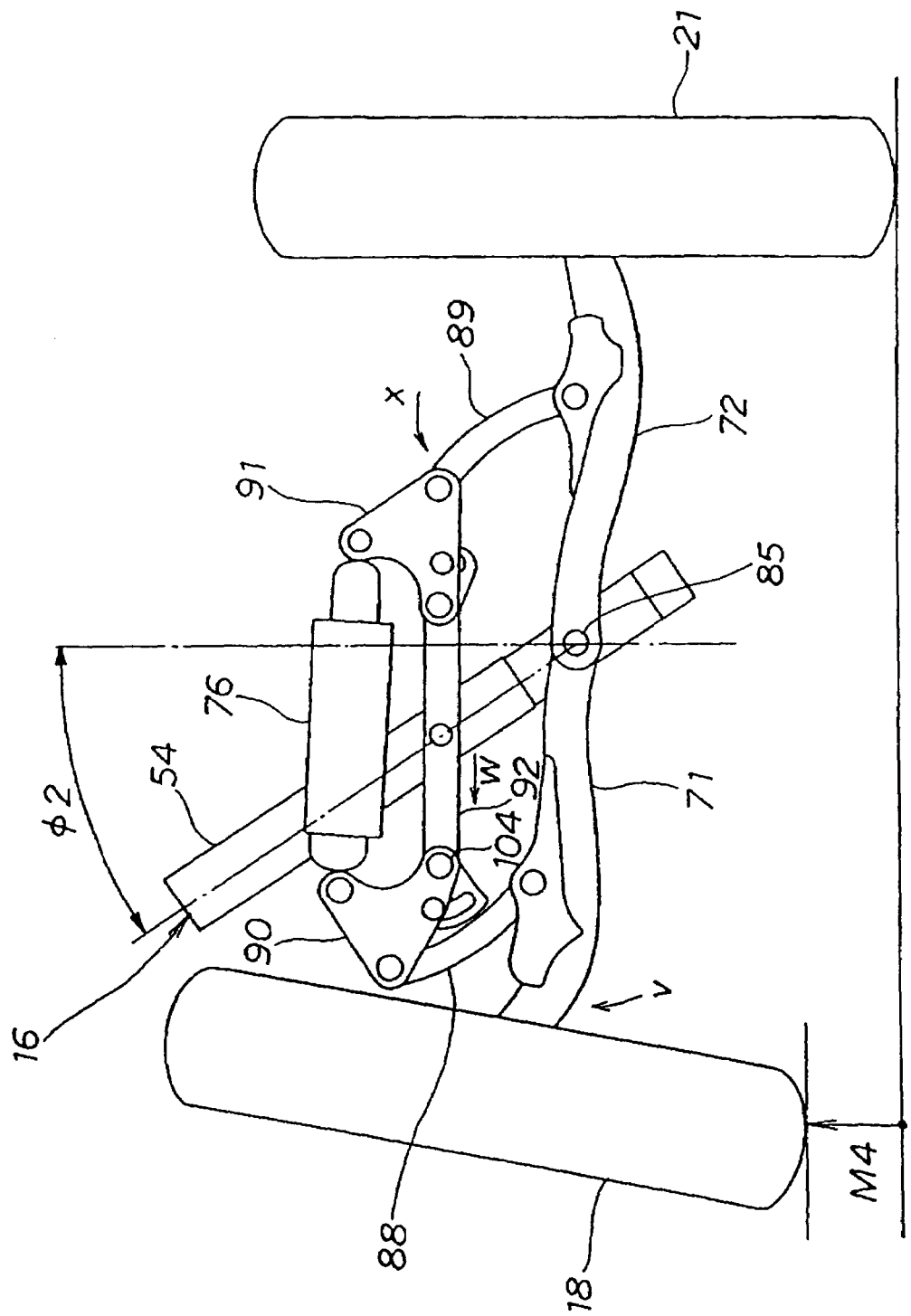
FIG. 18 shows a fifth action of the rear suspension according to the invention.
Figure 19:
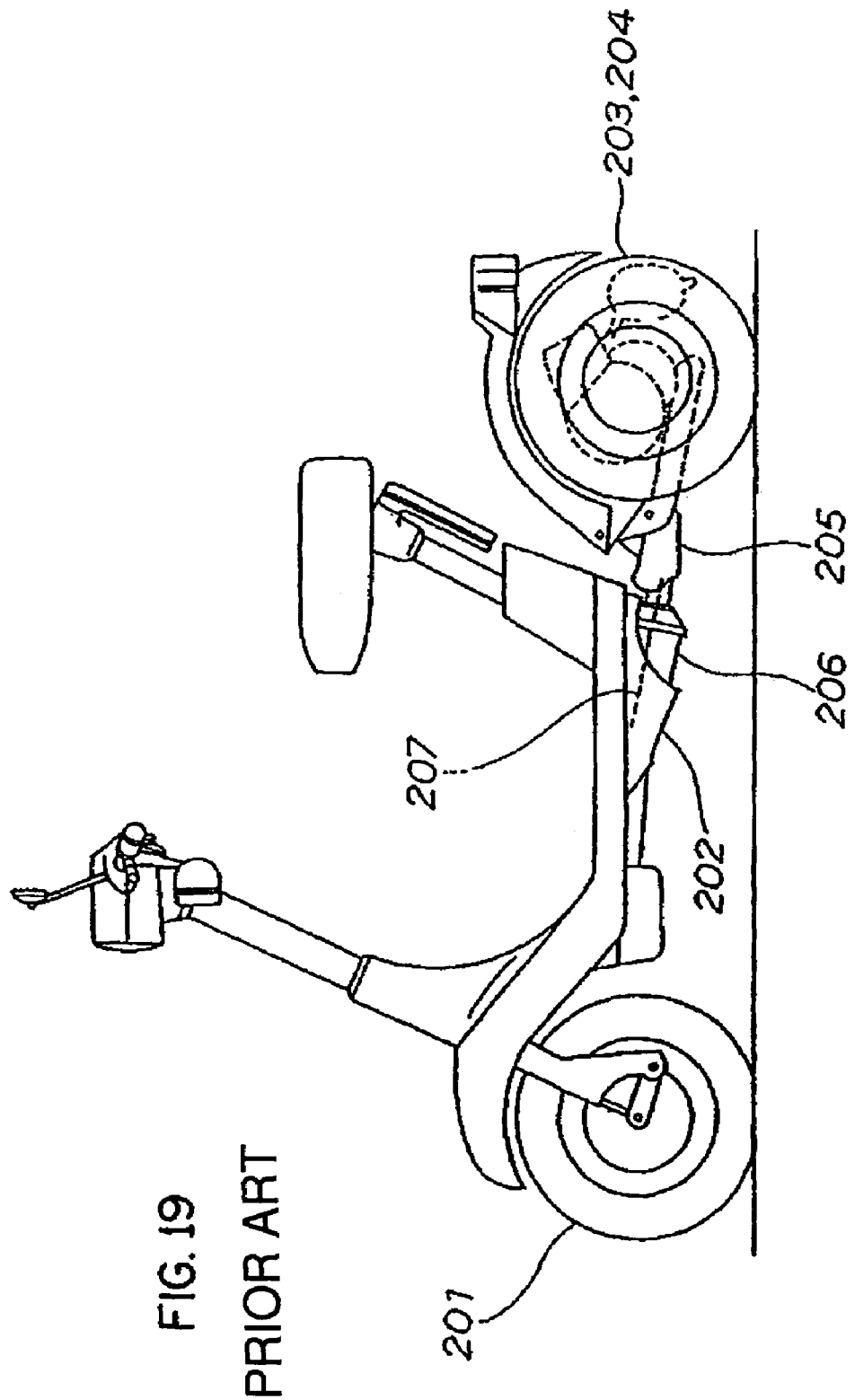
FIG. 19 is a side view showing a conventional type three-wheel vehicle provided with a swinging mechanism.
Figure 20:
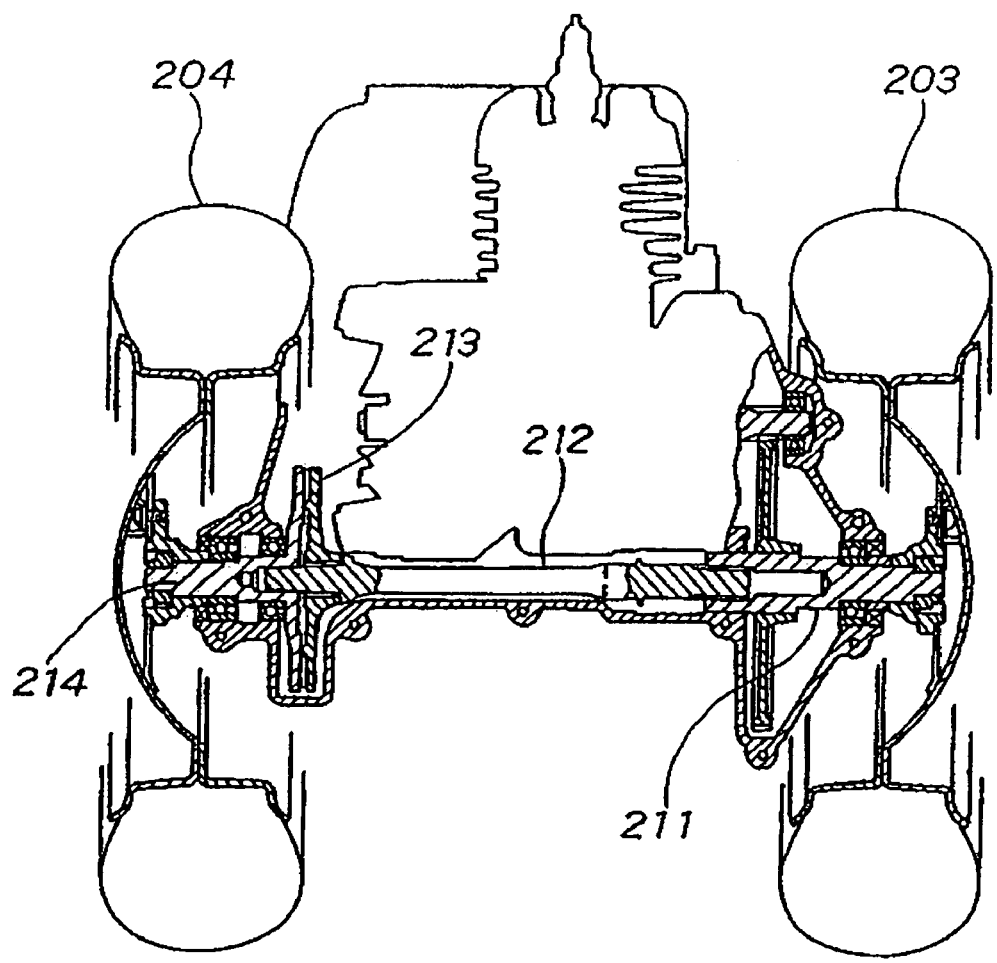
FIG. 20 is a sectional view showing the rear of the conventional type three-wheel vehicle provided with the swinging mechanism.

FIG. 18 shows the fifth action of the rear suspension according to the invention.

When the rear wheel 18 is lifted by the amount of movement M4 and the body frame 16, the L-type pipe 54 in this case is swung by an angle $\phi 2$ on the left side of the body from the state shown in FIG. 11, the suspension arm 71 is swung upward as shown by an arrow v with the rear swing shaft 85 and the front swing shaft 136 (see FIG. 9) in the center and the connecting member 92 is moved leftward as shown by an arrow w. Thus, the arc-shaped link 88 is lifted and inclined leftward, the arc-shaped link 89 is inclined leftward as shown by an arrow x, the bell crank 90 is swung clockwise with the second bolt 104 as a fulcrum and is moved leftward, the bell crank 91 is moved leftward, and as a result presses and contracts the shock absorber 76 and creates a buffer action.

As described in relation to FIGS. 3, 12 and 13, for example, the three-wheel vehicle provided with the swinging mechanism 10 in which the right and left rear wheels 21, 18 are attached to the right and the left of the body frame 16 via the suspension arms 72, 71 so that the rear wheels can be vertically moved and the swinging mechanism 93 (see FIG. 11) for allowing the lateral swing of the body frame 16 for the side of the suspension arms 72, 71 is provided between the side of the suspension arms 72, 71 and the side of the body frame 16, the front swinging shaft 136 and the rear swinging shaft 85 respectively as a spindle extended in the longitudinal direction of the body are attached to the body frame 16. The right and left suspension arms 72, 71 are mutually independently attached to the front swinging shaft 136 and the rear swinging shaft 85 so that the suspension arms can be vertically swung and the front swinging shaft 136 and the rear swinging shaft 85 also function as a swinging shaft for swinging the body frame 16.

Also, the rear wheels 21, 18 can be independently vertically moved without lateral interference by supporting the right and left rear wheels 21, 18 by the front swinging shaft 136 and the rear swinging shaft 85 via the mutually independent suspension arms 72, 71, compared with a case that right and left rear wheels are coupled via an axle in the conventional type, for example. The ability of the right and left rear wheels 21, 18 to follow the road surface is increased, thereby reducing roll of the body and enhancing ride comfort.

As the right and left suspension arms 72, 71 are attached to the same front swinging shaft 136 and the same rear swinging shaft 85, the number of parts can be reduced, compared with a case where right and left suspension arms are attached to separate swinging shafts and the cost can be reduced.

Further, as the front swinging shaft 136 and the rear swinging shaft 85 function as a swinging shaft, the number of parts can be reduced, compared with a case where a spindle and a swinging shaft are separately provided, and costs can be further reduced.

In addition, the suspension arms 71, 72 are the A-type arm as shown in FIG. 4. As the suspension arms 71, 72 are A-type, the rigidity of the suspension arms 71, 72 can be enhanced and the operational stability can be enhanced.

In the embodiment of the invention, the spindle is divided into the front swinging shaft 136 (see FIG. 12) and the rear swinging shaft 85 (see FIG. 13), however, the invention is not limited to this and the right and left suspension arms 72, 71 may be also swingably attached to one spindle.

The invention produces the following benefits. For the three-wheel vehicle provided with the swinging mechanism, as the spindle extended in the longitudinal direction of the body is attached to the body frame, the right and left suspension arms are mutually independently attached to the spindle so that the suspension arms can be vertically swung and the spindle also functions as a swinging shaft for swinging the body frame. Thus, the rear wheels can be independently vertically moved without lateral interference by supporting the right and left rear wheels by the spindle via the independent suspension arms, compared with a case that right and left rear wheels are coupled via an axle as in the conventional type, for example. The ability of the right and left rear wheels to follow the road surface is increased, the roll of the body can be reduced and the ride comfort can be enhanced.

As the right and left suspension arms are attached to the same spindle, the number of parts can be reduced, compared with a case that right and left suspension arms are attached to separate swinging shafts, and the cost can be reduced.

Further, as the spindle also functions as a swinging shaft, the number of parts can be reduced, compared with a case that a spindle and a swinging shaft are separately provided, and the cost can be further reduced.

Also, as the suspension arm is an A-type arm, the rigidity of the suspension arm can be enhanced and the operational stability can be enhanced.

The present invention should not be considered limited to the particular examples or materials described above, but rather should be understood to cover all aspect of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A suspension system for a vehicle, the suspension system comprising:
   right and left suspension arms, each suspension arm coupled to a frame of the vehicle and a wheel of the vehicle, the suspension arms being coupled to the frame so that the suspension anus are capable of independent movement;
   right and left linking mechanisms, each linking mechanism being coupled to the respective suspension arm;
   a shock absorber with two ends, one end of the shock absorber being coupled via the respective linking mechanism to the right arm and the other end of the shock absorber being coupled via the respective linking mechanism to the left arm;
   a swinging mechanism, the swinging mechanism being coupled to the right and left linking mechanisms and to the frame of the vehicle, the swinging mechanism being configured to provide a damping force to restrict rotation of the frame of the vehicle; and
   a connecting member being coupled to the right and left linking mechanisms,
   wherein the connecting member is attached to the frame via the swinging mechanism.

2. The suspension system according to claim 1, wherein the linking mechanisms comprise:
   right and left linking arms, respectively; and
   right and left bell cranks, respectively, wherein each bell crank is coupled to an end of the shock absorber, the respective linking arm, and to the swinging mechanism.

3. The suspension system according to claim 2, wherein each bell crank is coupled to the swinging mechanism via the connecting member, the connecting member being pivotably coupled to the frame of the vehicle.

4. The suspension system according to claim 3, wherein the swinging mechanism is a Neidhart damper.

5. The suspension system according to claim 3, wherein the linking arms are arc-shaped.

6. The suspension system according to claim 3, wherein the suspension arms are A-type arms.

7. A three-wheel vehicle with a suspension system, the suspension system comprising:
   a spindle extending in a longitudinal direction of the vehicle and attached to a body frame, the body frame being pivotably attached to the spindle;
   right and left suspension arms independently coupled to the spindle so that they are capabie of pivoting about the spindle;
   right and left rear wheels attached to a right and left side of the body frame via the respective suspension arms;
   a swinging mechanism coupled to the body frame, the swinging mechanism configured to restrict lateral rotation of the body frame and provided between the suspension arms and the body frame, and
   a shock absorber with two ends, each end of the shock absorber being coupled to a side of one of the suspension arms,
   wherein the shock absorber is coupled to the suspension arms via a linking mechanism, the linking mechanism comprising:
   right and left linking arms; and
   right and left bell cranks, each bell crank being coupled to an end of the shock absorber, the respective linking arm, and to the swinging mechanism.

8. The vehicle according to claim 7, wherein the suspension arms are A-type arms.

9. The vehicie according to claim 7, wherein each bell crank is coupled to the swinging mechanism via a connecting member, the connecting member being pivotably coupled to the frame of the vehicle.

10. The vehicle according to claim 7, wherein the swinging mechanism is a Neidhart damper.

11. The vehicle according to claim 7, wherein the linking arms are arc-shaped.

* * * * *